United States Patent
Mukae

(10) Patent No.: US 12,534,227 B2
(45) Date of Patent: Jan. 27, 2026

(54) SPACE TRAFFIC MANAGEMENT SYSTEM, SPACE TRAFFIC MANAGEMENT DEVICE, COLLISION AVOIDANCE ASSIST BUSINESS DEVICE, SSA BUSINESS DEVICE, MEGA-CONSTELLATION BUSINESS DEVICE, AND SPACE TRAFFIC MANAGEMENT METHOD

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 561 days.

(21) Appl. No.: 17/913,435

(22) PCT Filed: May 7, 2021

(86) PCT No.: PCT/JP2021/017582
§ 371 (c)(1),
(2) Date: Sep. 22, 2022

(87) PCT Pub. No.: WO2021/230168
PCT Pub. Date: Nov. 18, 2021

(65) Prior Publication Data
US 2023/0137948 A1    May 4, 2023

(30) Foreign Application Priority Data
May 12, 2020   (JP) .................................. 2020-084113

(51) Int. Cl.
*B64G 3/00*   (2006.01)
*B64G 1/10*   (2006.01)
(Continued)

(52) U.S. Cl.
CPC ............. *B64G 3/00* (2013.01); *B64G 1/1085* (2013.01); *B64G 1/2429* (2023.08); *B64G 1/244* (2019.05); *G06Q 40/08* (2013.01)

(58) Field of Classification Search
None
See application file for complete search history.

(56) References Cited

U.S. PATENT DOCUMENTS

| | | | |
|---|---|---|---|
| 10,614,544 B2 * | 4/2020 | Jia | B64G 7/00 |
| 2016/0188176 A1 | 6/2016 | Runnels | |
| 2018/0370658 A1 | 12/2018 | Amimoto et al. | |

FOREIGN PATENT DOCUMENTS

| | | |
|---|---|---|
| EP | 4 067 240 A1 | 10/2022 |
| EP | 4 119 449 A1 | 1/2023 |
| JP | 2017-114159 A | 6/2017 |

OTHER PUBLICATIONS

International Search Report and Written Opinion mailed on Jun. 20, 2021, received for PCT Application PCT/JP2021/017582, filed on May 7, 2021, 8 pages including English Translation.
(Continued)

*Primary Examiner* — Peter D Nolan
*Assistant Examiner* — Michael F Whalen
(74) *Attorney, Agent, or Firm* — XSENSUS LLP

(57) ABSTRACT

An orbital analysis unit (431) of a collision avoidance assist business device identifies a mega-constellation satellite group formed in an orbital altitude which the mega-constellation satellite group is anticipated to pass during a flight of an unsteady-operation space object. An announcement unit (432) of the collision avoidance assist business device announces a danger alarm and orbital information of the unsteady-operation space object, to a mega-constellation business device which manages the mega-constellation satellite group. A collision analysis unit (411) of a satellite mega-constellation business device analyzes collision of the
(Continued)

unsteady-operation space object with an individual satellite constituting the mega-constellation satellite group. A countermeasure formulating unit (412) of the satellite constellation business device formulates a collision avoidance countermeasure when collision is predicted.

20 Claims, 26 Drawing Sheets

(51) Int. Cl.
     *B64G 1/24*       (2006.01)
     *G06Q 40/08*     (2012.01)

(56)          References Cited

OTHER PUBLICATIONS

Partial Supplementary European Search Report issued Jan. 26, 2024 in European Patent Application No. 21803454.4, 16 pages.
Extended European Search Report issued Apr. 4, 2024 in European Patent Application No. 21803454.4, 16 pages.
International Search Report and Written Opinion mailed on Jul. 20, 2021, received for PCT Application PCT/JP2021/017582, filed on May 7, 2021, 8 pages including English Translation.
Extended European Search Report issued Jan. 3, 2025 in European Patent Application No. 24207878.0, 9 pages.

\* cited by examiner

Fig.11

51: ORBIT PREDICTION INFORMATION
511: SPACE OBJECT ID
512: PREDICTED EPOCH
513: PREDICTED ORBITAL ELEMENTS
514: PREDICTED ERRORS
52: SATELLITE ORBIT PREDICTION INFORMATION
53: DEBRIS ORBIT PREDICTION INFORMATION

| Satellite/Debris ID | Epoch | | Keplerian 6 Orbital Elements | | | | | | Predicted Error | | Basis |
|---|---|---|---|---|---|---|---|---|---|---|---|
| | | | Mean Motion | Eccentricity | Inclination | Right Ascension of Ascending Node RAAN | Argument of Perigee | Mean Anomaly | Traveling Direction | Orthogonal Direction | |
| | Year and Day | Orbiting per Day | No Unit | deg | deg | deg | deg | km | km | | |
| Satellite ID | | | | | | | | | | | |
| A | a1 | a2 | a3 | a4 | a5 | a6 | a7 | a8 | a9 | On-Orbit Measurement Value |
| B | b1 | b2 | b3 | b4 | b5 | b6 | b7 | b8 | b9 | On-Orbit Measurement Value |
| C | c1 | c2 | c3 | c4 | c5 | c6 | c7 | c8 | c9 | Analysis Value |
| D | d1 | d2 | d3 | d4 | d5 | d6 | d7 | d8 | d9 | Terrestrial Measurement Value |
| E | e1 | e2 | e3 | e4 | e5 | e6 | e7 | e8 | e9 | Terrestrial Measurement Value |
| F | f1 | f2 | f3 | f4 | f5 | f6 | f7 | f8 | f9 | SSA Measurement Value |
| Debris ID | | | | | | | | | | | |
| A | α1 | α2 | α3 | α4 | α5 | α6 | α7 | α8 | α9 | SSA Measurement Value |
| B | β1 | β2 | β3 | β4 | β5 | β6 | β7 | β8 | β9 | SSA Measurement Value |
| Γ | γ1 | γ2 | γ3 | γ4 | γ5 | γ6 | γ7 | γ8 | γ9 | SSA Measurement Value |
| Δ | δ1 | δ2 | δ3 | δ4 | δ5 | δ6 | δ7 | δ8 | δ9 | SSA Measurement Value |

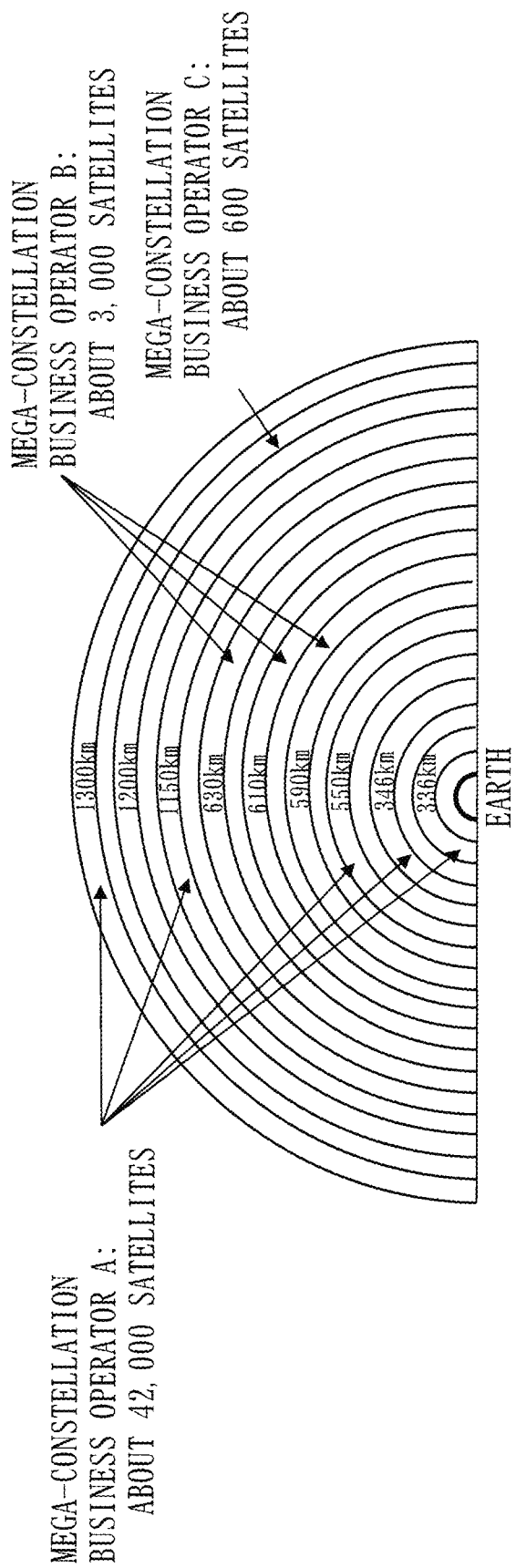

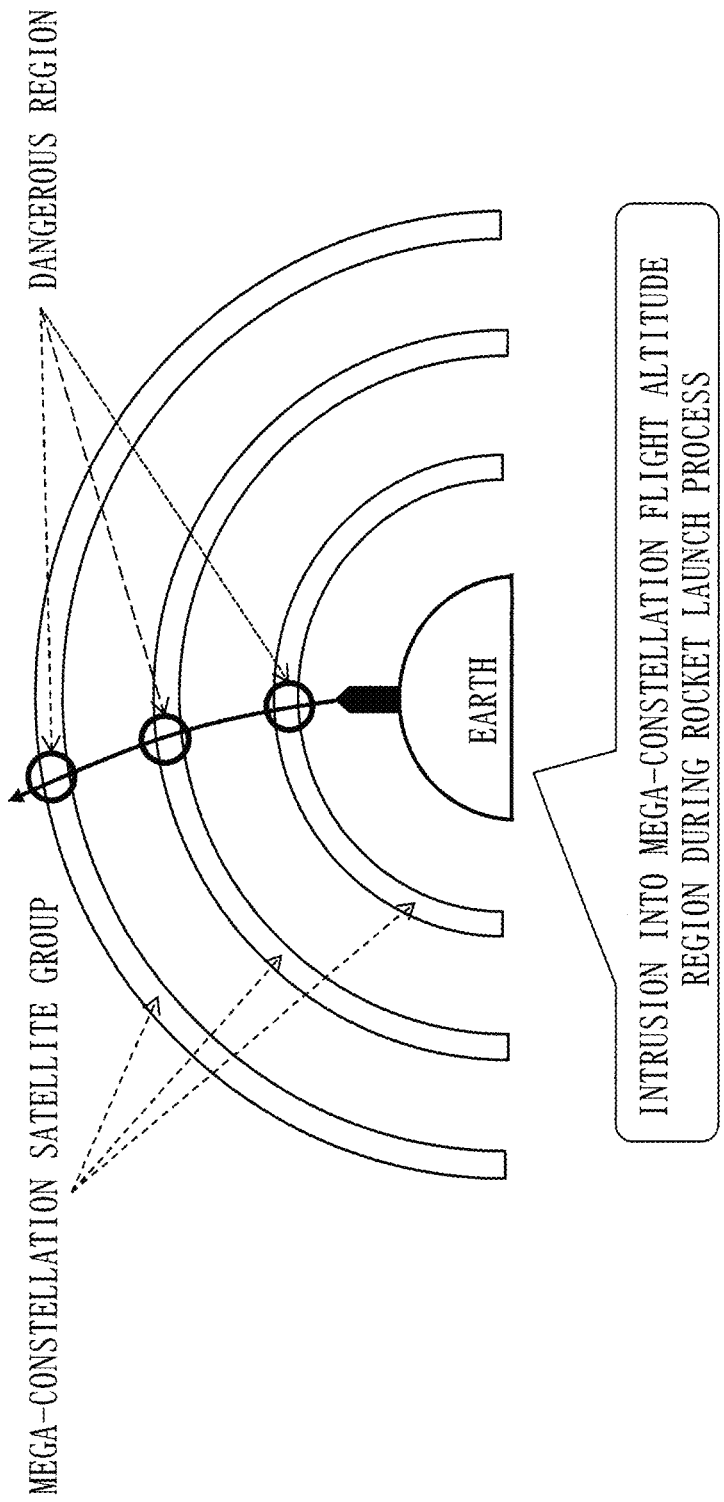

Fig. 21

EXAMPLE OF SPACE INFORMATION RECORDER 101 OF MEGA-CONSTELLATION BUSINESS DEVICE B

SPACE INFORMATION RECORDER 101

| SATELLITE GROUP ID | PUBLIC ORBITAL INFORMATION 61 | | |
|---|---|---|---|
| | CONSTITUENT SATELLITE INFORMATION (NUMBER OF SATELLITES, ID) | ORBITAL ALTITUDE UPPER LIMIT/LOWER LIMIT | ORBITAL INCLINATION UPPER LIMIT/LOWER LIMIT |

| SATELLITE ID | REAL-TIME HIGH-ACCURACY ORBITAL INFORMATION 64 | | | | | | |
|---|---|---|---|---|---|---|---|
| | PREDICTED ORBITAL INFORMATION | | | | | | |
| | EPOCH | ORBITAL ELEMENT | PREDICTED ERROR | | | INFORMATION PROVIDER BUSINESS DEVICE ID | INFORMATION UPDATE DATE |
| | | | ORBITAL RADIUS ERROR $\Delta r$ | LATITUDE ANGLE ERROR $\Delta \Theta az$ | LONGITUDE ANGLE ERROR $\Delta \Theta el$ | VERIFICATION PERFORMANCE | |
| | TIME ERROR $\Delta t$ | | | | | | |
| | PERFORMANCE ORBITAL INFORMATION | | | | | | |
| | UTS TIME | POSITION COORDINATES | MEASUREMENT ERROR | | | INFORMATION PROVIDER BUSINESS DEVICE ID | INFORMATION UPDATE DATE |
| | | | ORBITAL RADIUS ERROR $\Delta r$ | LATITUDE ANGLE ERROR $\Delta \Theta az$ | LONGITUDE ANGLE ERROR $\Delta \Theta el$ | MEASUREMENT MEANS | |
| | TIME ERROR $\Delta t$ | | | | | | |

| SATELLITE ID | UNSTEADY ORBITAL INFORMATION 63 | | | | |
|---|---|---|---|---|---|
| | PREDICTED ORBITAL INFORMATION | | | | |
| | EPOCH | ORBITAL ELEMENT | PREDICTED ERROR | INFORMATION PROVIDER BUSINESS DEVICE ID | INFORMATION UPDATE DATE |

SPACE TRAFFIC MANAGEMENT SYSTEM, SPACE TRAFFIC MANAGEMENT DEVICE, COLLISION AVOIDANCE ASSIST BUSINESS DEVICE, SSA BUSINESS DEVICE, MEGA-CONSTELLATION BUSINESS DEVICE, AND SPACE TRAFFIC MANAGEMENT METHOD

CROSS-REFERENCE TO RELATED APPLICATIONS

The present application is based on PCT filing PCT/JP2021/017582, filed May 7, 2021, which claims priority to JP 2020-084113, filed May 12, 2020, the entire contents of each are incorporated herein by reference.

TECHNICAL FIELD

The present disclosure relates to a space traffic management system, a space traffic management device, a collision avoidance assist business device, an SSA business device, a mega-constellation business device, a space traffic management method, and an OADR.

BACKGROUND ART

In recent years, construction of a large-scale satellite constellation consisting of several hundred to several thousand satellites, or a so-called mega-constellation, has started, and a risk of satellite collision on an orbit is increasing. In addition, space debris such as satellites that have become uncontrollable due to failure, and rocket wreckage are increasing.

With this rapid increase of space objects such as satellites and space debris in outer space, there is an increasing need in space traffic management (STM) to create international rules for avoiding collisions of space objects.

Patent Literature 1 discloses a technique of forming a satellite constellation consisting of a plurality of satellites on the same circular orbit.

Conventionally, a framework exists with which the U.S. Combined Space Operations Center (CSpOC) continuously monitors space objects and issues an alarm when approach of space objects to each other or collision of space objects against each other is anticipated. In response to this alarm, manned space stations and commercial communication satellites carry out avoidance operation when it is determined to be necessary. However, in recent years, projects have been announced in the United States to transfer the framework of issuing alarms to private satellites, to a private business operator, and a new framework has been in need.

CITATION LIST

Patent Literature

Patent Literature 1: JP 2017-114159 A

SUMMARY OF INVENTION

Technical Problem

A framework is not available that allows mega-constellation business operators to avoid collisions with each other so that flight safety is ensured at an unsteady operation stage such as orbit insertion and orbital disposal. Thus, collision avoidance operations might be insufficient in the future.

Patent Literature 1 does not describe a framework that allows mega-constellation business operators to avoid collisions with each other so that flight safety is ensured.

The present disclosure has as its objective to provide a framework that allows a plurality of mega-constellation business devices to avoid collisions with each other so that flight safety is ensured at an unsteady operation stage such as orbit insertion and orbital disposal.

Solution to Problem

In a space traffic management system according to the present disclosure, space traffic management devices, individually mounted in a collision avoidance assist business device and a plurality of mega-constellation business devices and each including a database and a server, are connected to each other via a communication line, the collision avoidance assist business device assisting avoidance of collision of space objects with each other in outer space, the plurality of mega-constellation business devices managing mega-constellations which are satellite constellations each consisting of 100 or more satellites, wherein the database provided to the space traffic management device of the collision avoidance assist business device records orbital information, acquired from the plurality of mega-constellation business devices, of mega-constellation satellite groups during steady operation, and orbital information of an unsteady-operation space object, wherein the server provided to the space traffic management device of the collision avoidance assist business device comprises an orbital analysis unit to identify a mega-constellation satellite group formed in an orbital altitude which the mega-constellation satellite group is anticipated to pass during a flight of the unsteady-operation space object, and an announcement unit to announce a danger alarm and orbital information of the unsteady-operation space object to the mega-constellation business devices which manage the mega-constellation satellite groups, and wherein the server provided to the space traffic management device of each of the collision avoidance assist business devices comprises a collision analysis unit to analyze collision of the unsteady-operation space object with an individual satellite constituting a mega-constellation satellite group, and a countermeasure formulating unit to formulate a collision avoidance countermeasure when collision is predicted.

Advantageous Effects of Invention

A space traffic management system according to the present disclosure can provide a framework that allows a plurality of mega-constellation business devices to avoid collisions with each other so that flight safety is ensured at an unsteady operation stage such as orbit insertion and orbital disposal.

BRIEF DESCRIPTION OF DRAWINGS

FIG. 11 presents an example of orbital prediction information provided to a space information recorder according to Embodiment 1.

FIG. 12 presents a business example of mega-constellations currently under planning.

FIG. 13 is a diagram illustrating intrusion of a new launch rocket into mega-constellation satellite groups according to Embodiment 1.

FIG. 21 presents a detailed configuration example of a space information recorder of the mega-constellation business device according to Embodiment 1.

DESCRIPTION OF EMBODIMENTS

Figure 1:
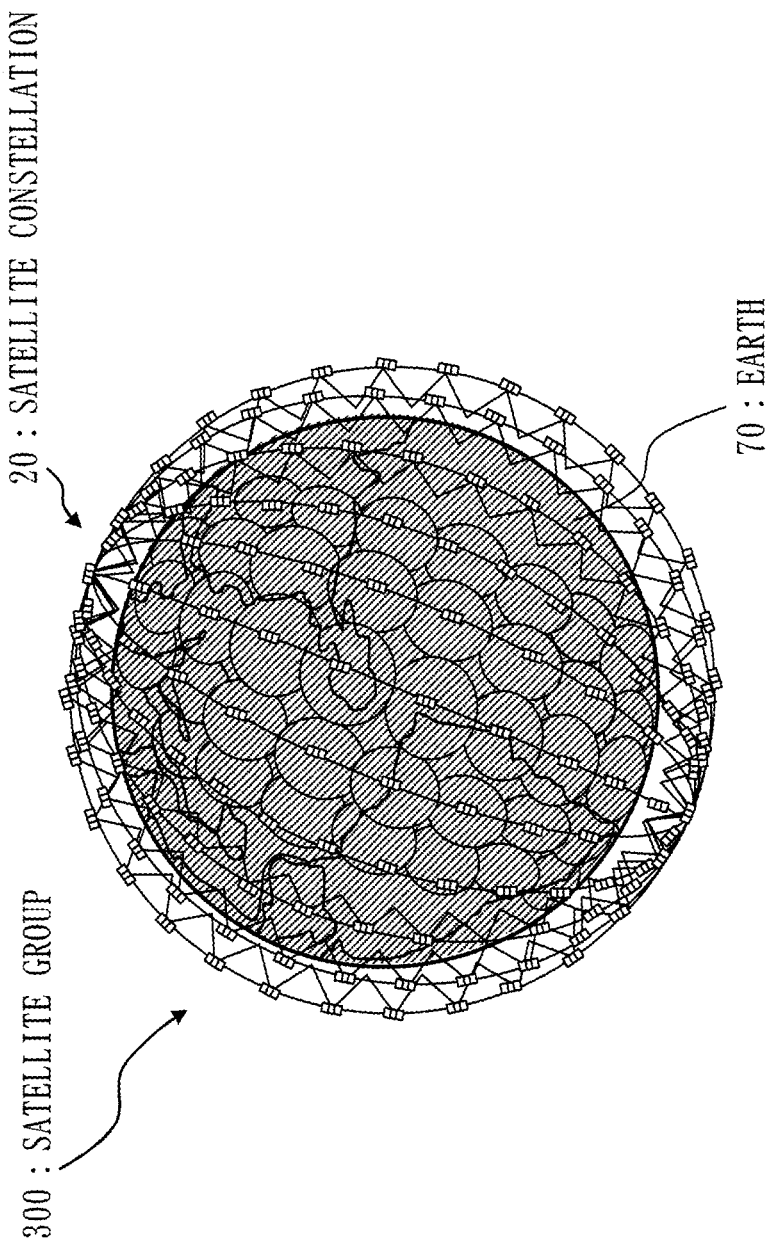
FIG. 1 presents an example in which a plurality of satellites cooperate with each other to realize a global communication service around the entire Earth.

Embodiments of the present disclosure will now be described below with referring to drawings. In the drawings, the same or equivalent portion is denoted by the same reference sign. In description of the embodiments, where appropriate, the same or equivalent portion will not be described, or will be described only briefly. Further, in the drawings below, a relationship in size among configurations may differ from what it actually is. Further, in description of the embodiments, sometimes a direction or position such as "upper", "lower", "left", "right", "forward", "backward", "front", and "rear" is indicated. These notations are merely given for descriptive convenience and do not limit a layout and orientation of a configuration such as a device, an appliance, and a component.

Embodiment 1

An example of a satellite constellation which is a prerequisite for a space traffic management system according to the embodiment below will be described.

FIG. 1 is a diagram illustrating an example in which a plurality of satellites cooperate with each other to realize a global communication service around an entire Earth 70.

FIG. 1 illustrates a satellite constellation 20 that realizes the communication service around the entire Earth.

Regarding a plurality of satellites flying on the same orbital plane and at the same altitude, a ground communication service range of each satellite overlaps with a communication service range of a following satellite. Hence, with the plurality of such satellites, the plurality of satellites on the same orbital plane can provide a communication service for a particular point on the ground alternately in a time-division manner. If an adjacent orbital plane is formed, the communication service can exhaustively cover the surface of the ground between adjacent orbits. Likewise, if a large number of orbital planes are arranged almost evenly around the Earth, it is possible to provide a global communication service for the ground around the entire Earth.

Figure 2:
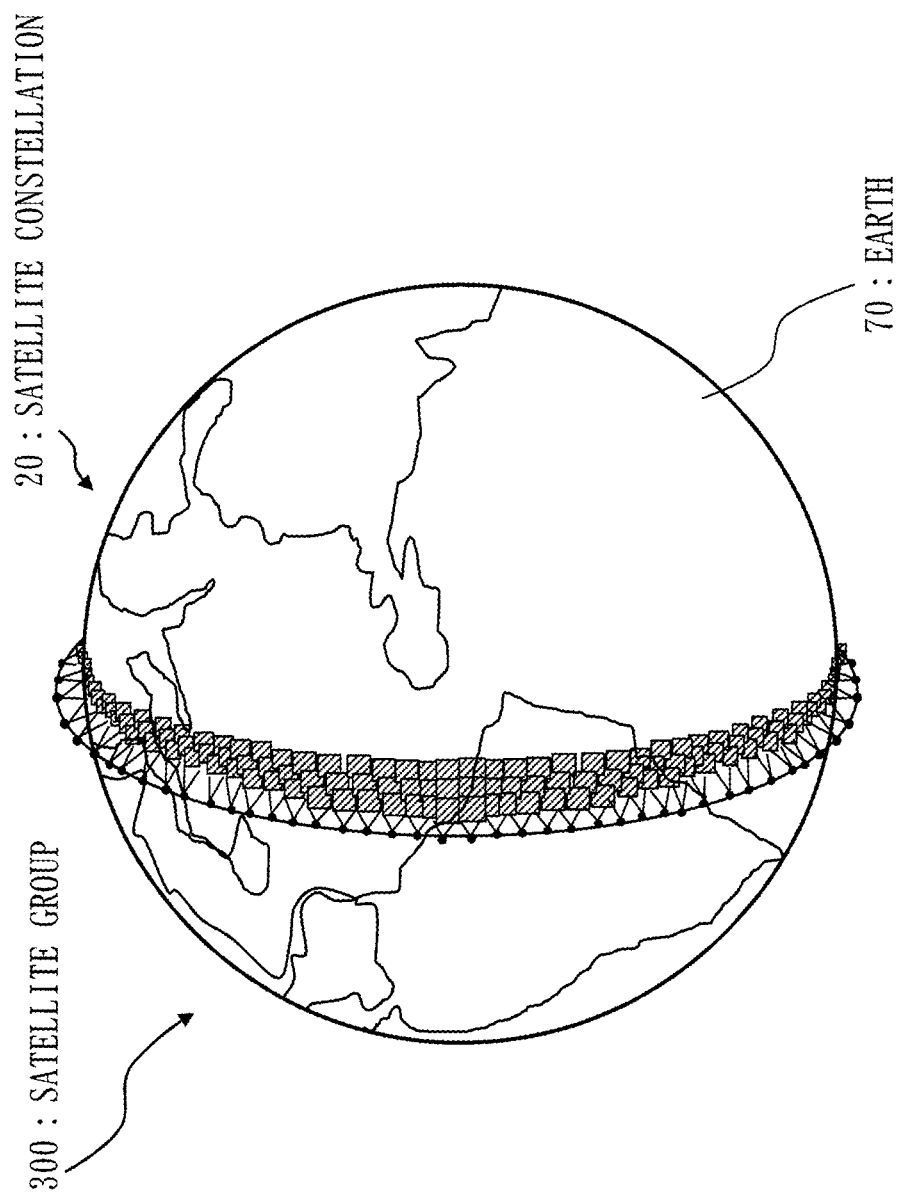
FIG. 2 presents an example in which a plurality of satellites having the same single orbital plane realize an Earth observation service.

FIG. 2 is a diagram illustrating an example in which a plurality of satellites having the same single orbital plane realize an Earth observation service.

FIG. 2 illustrates a satellite constellation 20 that realizes the Earth observation service. In the satellite constellation 20 of FIG. 2, satellites each equipped with an Earth observation device, which is an optical sensor or a radio wave sensor such as a synthetic aperture radar, fly on the same orbital plane and at the same altitude. In this manner, with a satellite group 300 in which a ground imaging range of a following satellite overlaps a preceding ground imaging range with a time delay, the plurality of satellites on the orbit sense a ground image of a particular point on the ground alternately in a time-division manner, thereby providing the Earth observation service.

In this manner, the satellite constellation 20 is constituted of the satellite groups 300 each formed of the plurality of satellites having individual orbital planes. In the satellite constellation 20, the service is provided by cooperation of the satellite group 300. The satellite constellation 20 specifically refers to a satellite constellation formed of one satellite group run by a communication business service company as illustrated in FIG. 1, or by an observation business service company as illustrated in FIG. 2.

Figure 3:
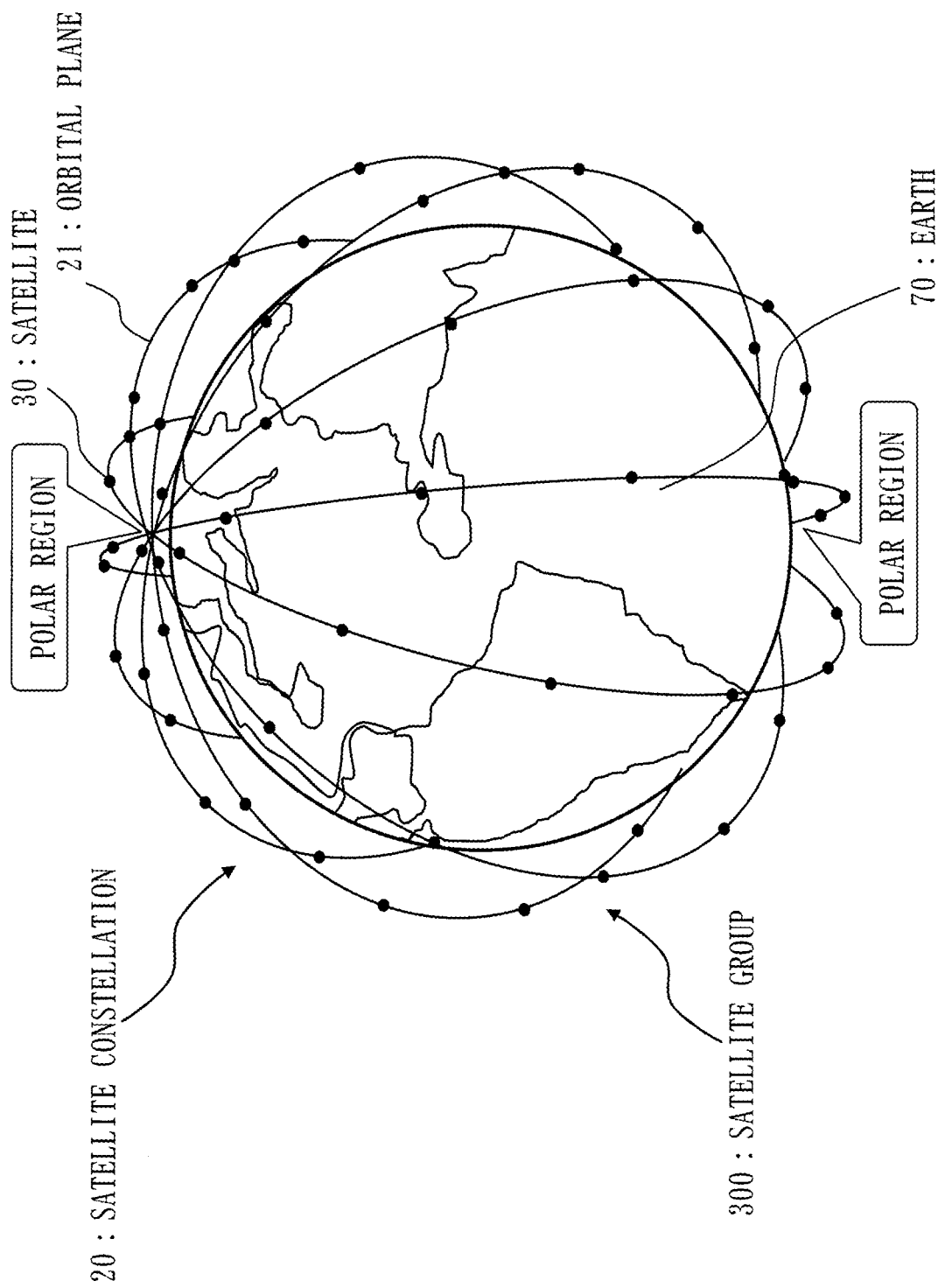
FIG. 3 presents an example of a satellite constellation having a plurality of orbital planes intersecting in vicinities of polar regions.
Figure 4:
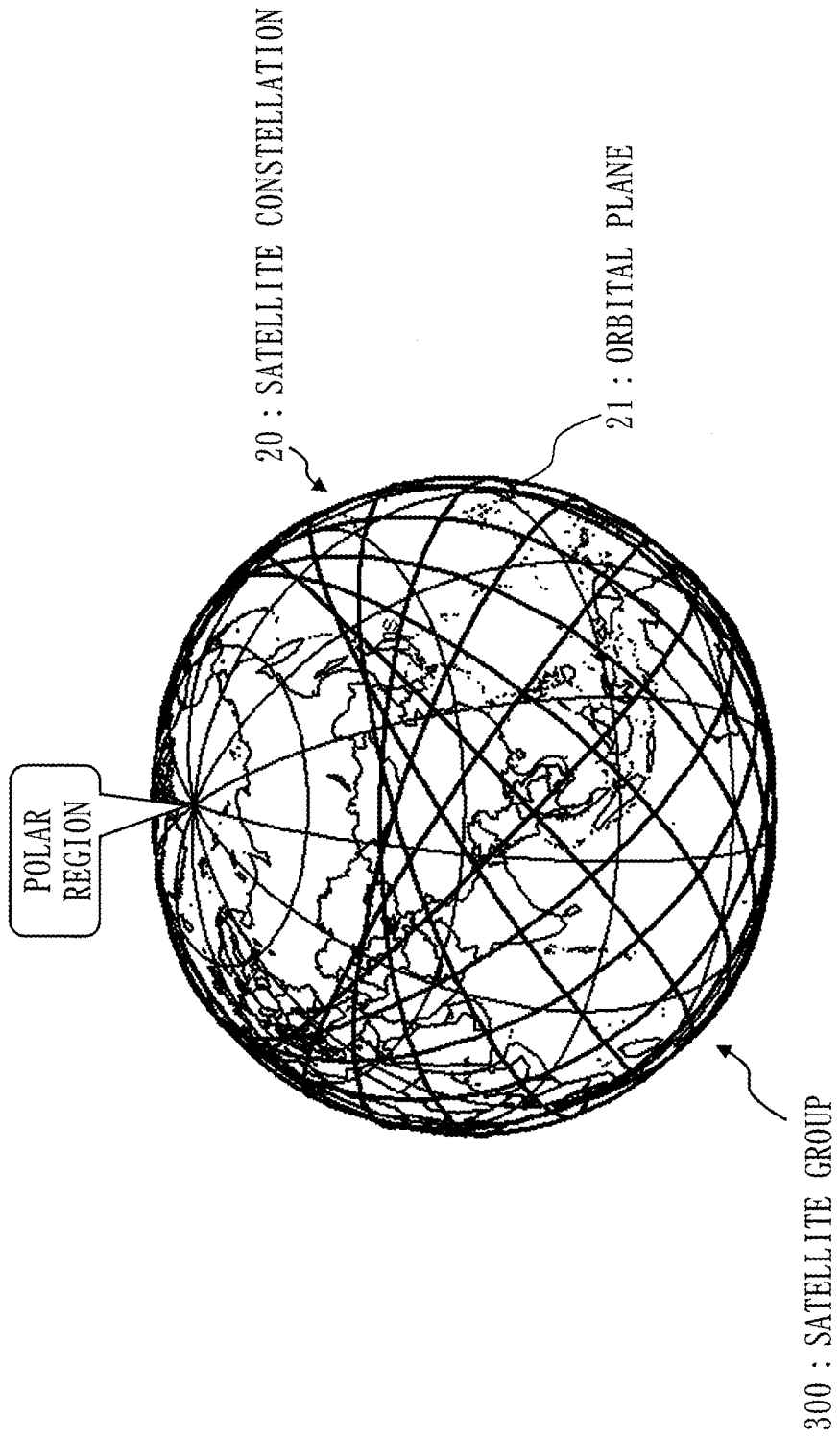
FIG. 4 presents an example of a satellite constellation having a plurality of orbital planes intersecting outside of the polar regions.

FIG. 3 presents an example of a satellite constellation 20 having a plurality of orbital planes 21 intersecting in vicinities of polar regions. FIG. 4 presents an example of a satellite constellation 20 having a plurality of orbital planes 21 intersecting outside of the polar regions.

In the satellite constellation 20 of FIG. 3, orbital inclinations of the individual orbital planes 21 of the plurality of orbital planes are approximately 90 degrees, and the individual orbital planes 21 of the plurality of orbital planes exist on different planes.

In the satellite constellation 20 of FIG. 4, orbital inclinations of orbital planes 21 of the plurality of orbital planes are not approximately 90 degrees, and the individual orbital planes 21 of the plurality of orbital planes exist on different planes.

In the satellite constellation 20 of FIG. 3, two arbitrary orbital planes intersect at points in the vicinities of polar regions. In the satellite constellation 20 of FIG. 4, two arbitrary orbital planes intersect at points outside of the polar regions. In FIG. 3, there is a possibility that collision of satellites 30 occurs in the vicinities of the polar regions. As illustrated in FIG. 4, intersections of the plurality of orbital planes having orbital inclinations of more than 90 degrees move to separate from the polar regions according to the orbital inclinations. Also, depending on a combination of the orbital planes, there is a possibility that the orbital planes intersect at various positions including a vicinity of an equator. Accordingly, a location where collision of the satellites 30 can occur varies. The satellites 30 are also called artificial satellites.

Particularly, in recent years, construction of a large-scale satellite constellation consisting of several hundred to several thousand satellites has started, and a risk of satellite collision on the orbit is increasing. In addition, debris such as artificial satellites that have become uncontrollable due to failure, and rocket wreckage, are increasing. The large-scale satellite constellation is also called a mega-constellation. Such debris is also called space debris.

In this manner, as the debris increases in outer space and a number of satellites typically represented by mega-constellations increases rapidly, demands for space traffic management (STM) have arisen.

Also, to realize orbital transfer of a space object, demands have arisen for post-mission disposal (PMD) that takes place after a mission on the orbit is ended, or for ADR according to which debris such as a failed satellite and a floating upper block of a rocket is subjected to orbital disposal by an external means such as a debris removal satellite. International discussion for STM about such ADR demands has begun. PMD stands for Post Mission Disposal. ADR stands for Active Debris Removal. STM stands for Space Traffic Management.

With referring to FIGS. 5 to 8, description will be made on an example of a satellite 30 and a ground facility 700 in a satellite constellation forming system 600 which forms the satellite constellation 20. For example, the satellite constellation forming system 600 is operated by a business operator that runs a satellite constellation business of a mega-constellation business device 41, an LEO constellation business device, a satellite business device, or the like. LEO stands for Low Earth Orbit.

A satellite control scheme using the satellite constellation forming system 600 is also applied to a business device 40 that controls a satellite. For example, this satellite control scheme may be loaded in a business device 40 such as a debris removal business device 45 which manages a debris removal satellite, a rocket launch business device 46 which launches a rocket, and orbital transfer business devices 44 which manage orbital transfer satellites.

The satellite control scheme using the satellite constellation forming system 600 may be loaded in any business device as far as it is a business device of a business operator that manages a space object 60.

Individual devices of the business devices 40 will be described later.

Figure 5:
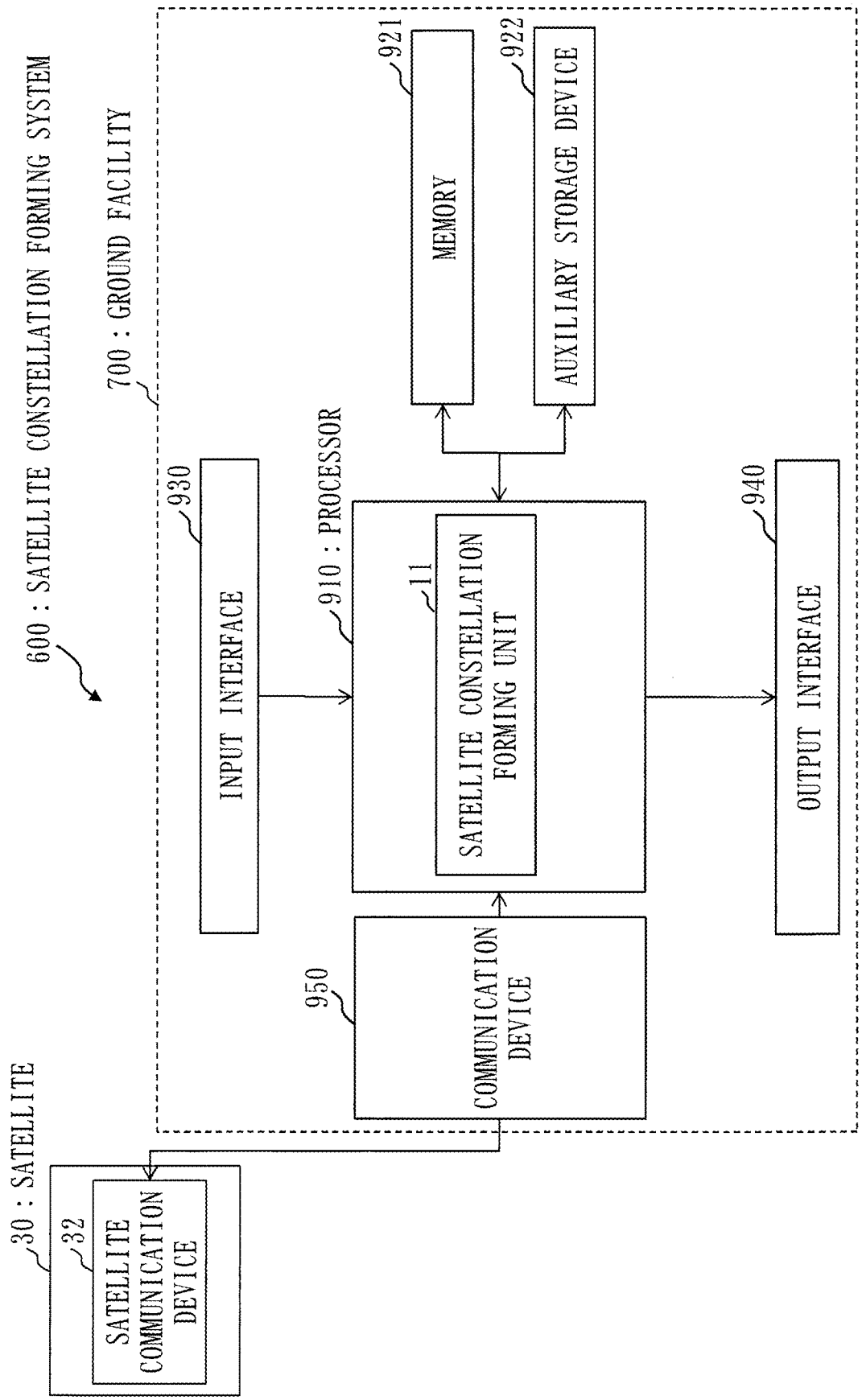
FIG. 5 is a configuration diagram of a satellite constellation forming system.

FIG. 5 is a configuration diagram of the satellite constellation forming system 600.

The satellite constellation forming system 600 is provided with a computer. FIG. 5 illustrates a one-computer configuration. In practice, computers are provided to the individual satellites 30 of the plurality of satellites constituting the satellite constellation 20 and to the ground facility 700 which communicates with the satellites 30. The computers provided to the individual satellites 30 of the plurality of satellites and to the ground facility 700 communicating with the satellites 30 cooperate with each other to implement functions of the satellite constellation forming system 600. In the following, an example of a configuration of a computer that implements the functions of the satellite constellation forming system 600 will be described.

The satellite constellation forming system 600 is provided with the satellites 30 and the ground facility 700. Each satellite 30 is provided with a satellite communication device 32 to communicate with a communication device 950 of the ground facility 700. FIG. 5 illustrates the satellite communication device 32 among configurations provided to the satellite 30.

The satellite constellation forming system 600 is provided with a processor 910 and other hardware devices as well, such as a memory 921, an auxiliary storage device 922, an input interface 930, an output interface 940, and a communication device 950. The processor 910 is connected to the other hardware devices via a signal line and controls the other hardware devices. The hardware of the satellite constellation forming system 600 is the same as hardware of a space traffic management device 100 to be described later with referring to FIG. 9.

The satellite constellation forming system 600 is provided with a satellite constellation forming unit 11 as a function element. A function of the satellite constellation forming unit 11 is implemented by hardware or software.

The satellite constellation forming unit 11 controls formation of the satellite constellation 20 while communicating with the satellites 30.

Figure 6:
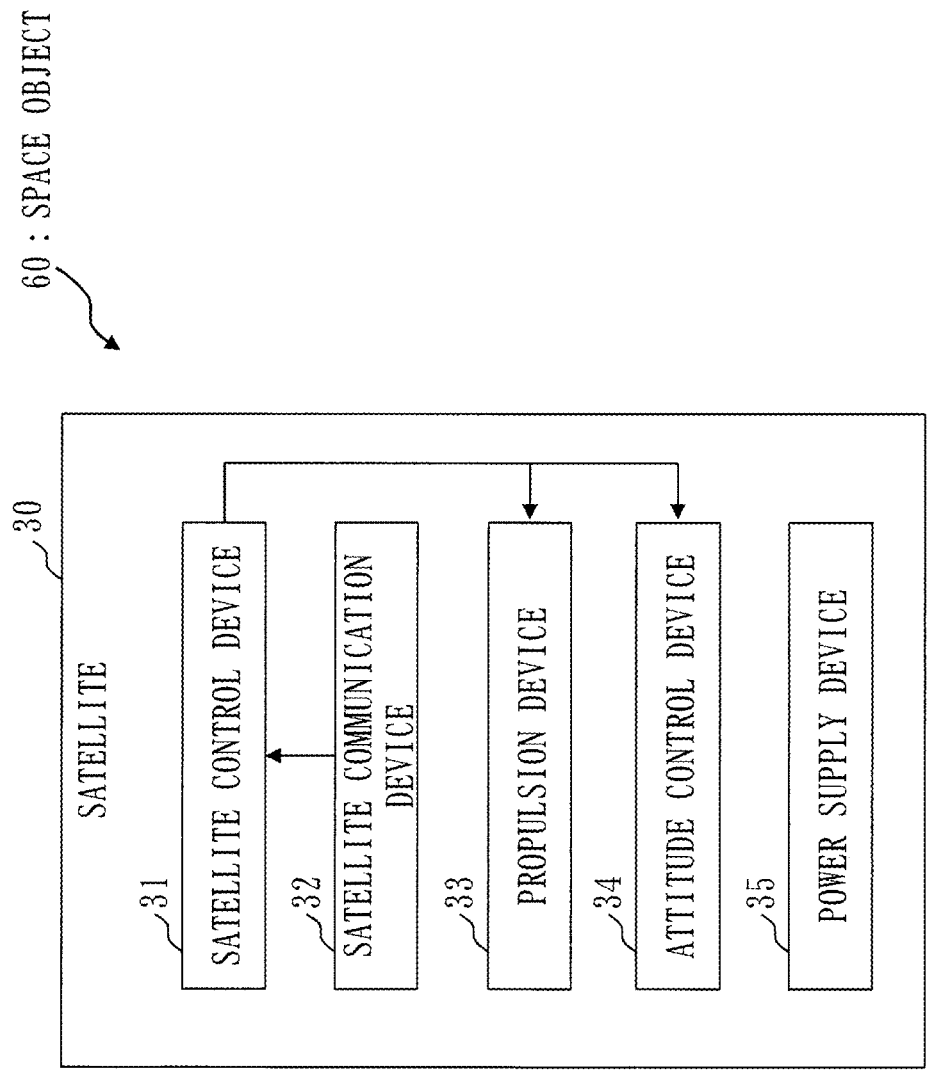
FIG. 6 is a configuration diagram of a satellite of the satellite constellation forming system.

FIG. 6 is a configuration diagram of the satellite 30 of the satellite constellation forming system 600.

The satellite 30 is provided with a satellite control device 31, a satellite communication device 32, a propulsion device 33, an attitude control device 34, and a power supply device 35. The satellite 30 is also provided with other constituent elements that implement various types of functions. With referring to FIG. 6, description will be made on the satellite control device 31, the satellite communication device 32, the propulsion device 33, the attitude control device 34, and the power supply device 35. The satellite 30 is an example of the space object 60.

The satellite control device 31 is a computer that controls the propulsion device 33 and the attitude control device 34, and is provided with a processing circuit. Specifically, the satellite control device 31 controls the propulsion device 33 and the attitude control device 34 in accordance with various types of commands transmitted from the ground facility 700.

The satellite communication device 32 is a device that communicates with the ground facility 700. Specifically, the satellite communication device 32 transmits various types of data concerning its own satellite to the ground facility 700.

The satellite communication device 32 receives various types of commands transmitted from the ground facility 700.

The propulsion device 33 is a device to give propulsion to the satellite 30 and changes a speed of the satellite 30. Specifically, the propulsion device 33 is an apogee kick motor, a chemical propulsion device, or an electric propulsion device. The apogee kick motor (AKM) refers to an upper-block propulsion device used for orbit insertion of an artificial satellite, and is also called an apogee motor (when a solid rocket motor is employed) or an apogee engine (when a liquid engine is employed).

The chemical propulsion device is a thruster that uses a one-component or two-component fuel. An example of the electric propulsion device is an ion engine or a Hall thruster. Apogee kick motor is a name of a device used for orbital transfer, and is sometimes a kind of chemical propulsion device.

The attitude control device 34 is a device to control attitude elements such as an attitude of the satellite 30, an angular velocity of the satellite 30, and a Line of Sight. The attitude control device 34 changes the attitude elements into desired directions. Alternatively, the attitude control device 34 maintains the attitude elements in desired directions. The attitude control device 34 is provided with an attitude sensor, an actuator, and a controller. The attitude sensor is a device such as a gyroscope, an Earth sensor, a sun sensor, a star tracker, a thruster, and a magnetic sensor. The actuator is a device such as an attitude control thruster, a momentum wheel, a rection wheel, and a control moment gyro. The controller controls the actuator in accordance with measurement data of the attitude sensor or various types of commands from the ground facility 700.

The power supply device 35 is provided with apparatuses such as a solar cell, a battery, and a power control device, and supplies power to the apparatuses mounted in the satellite 30.

The processing circuit provided to the satellite control device 31 will be described.

The processing circuit may be dedicated hardware, or may be a processor that runs a program stored in the memory.

In the processing circuit, some of its functions may be implemented by dedicated hardware, and its remaining functions may be implemented by software or firmware. That is, the processing circuit can be implemented by hardware, software, or firmware; or a combination of hardware, software, and firmware.

The dedicated hardware is specifically a single circuit, a composite circuit, a programmed processor, a parallel-programmed processor, an ASIC, or an FPGA; or a combination of a single circuit, a composite circuit, a programmed processor, a parallel-programmed processor, an ASIC, and an FPGA.

ASIC stands for Application Specific Integrated Circuit. FPGA stands for Field Programmable Gate Array.

Figure 7:
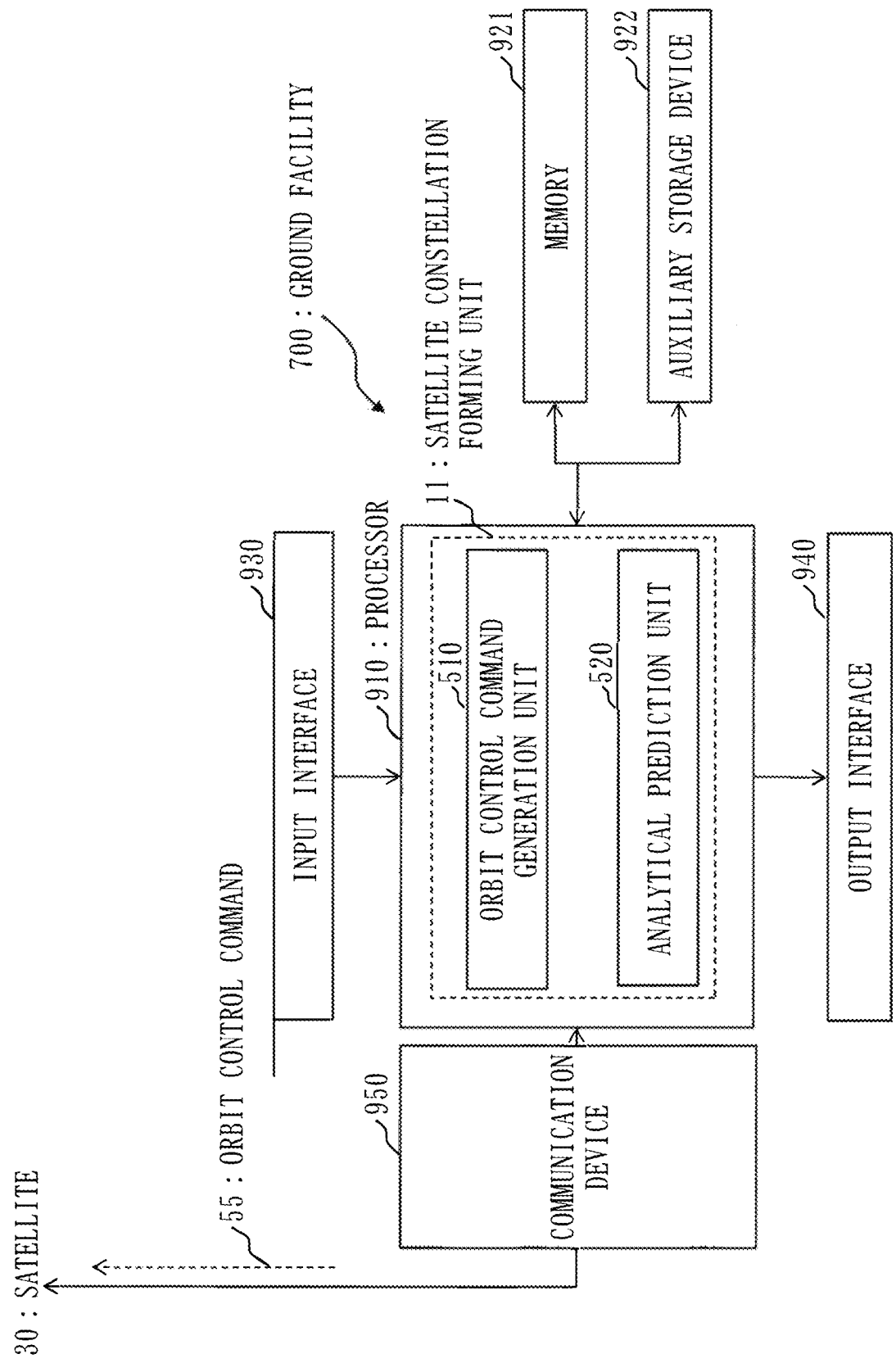
FIG. 7 is a configuration diagram of a ground facility of the satellite constellation forming system.

FIG. 7 is a configuration diagram of the ground facility 700 provided to the satellite constellation forming system 600.

The ground facility 700 program-controls a large number of satellites on every orbit plane. The ground facility 700 is an example of a ground device. The ground device is constituted of: a ground station including, for example, a ground antenna device, a communication device connected to the ground antenna device, and an electronic calculator; and a ground facility serving as a server or terminal connected to the ground station via a network. The ground device may include a communication device mounted in a mobile body such as an aircraft, an automotive vehicle, and a mobile terminal.

The ground facility 700 forms the satellite constellation 20 through communication with the satellites 30. The ground facility 700 is provided to the space traffic management device 100. The ground facility 700 is provided with the processor 910 and other hardware devices such as the memory 921, the auxiliary storage device 922, the input interface 930, the output interface 940, and the communication device 950. The processor 910 is connected to the other hardware devices via the signal line and controls the other hardware devices. The hardware of the ground facility 700 is the same as hardware of the space traffic management device 100 to be described later with referring to FIG. 9.

The ground facility 700 is provided with an orbit control command generation unit 510 and an analytical prediction unit 520, as function elements. Functions of the orbit control command generation unit 510 and analytical prediction unit 520 are implemented by hardware or software.

The communication device 950 transmits and receives a signal that performs tracking control of the satellites 30 of the satellite group 300 constituting the satellite constellation 20. Also, the communication device 950 transmits an orbit control command 55 to the satellites 30.

The analytical prediction unit 520 analytically predicts orbits of the satellites 30.

The orbit control command generation unit 510 generates the orbit control command 55 to be transmitted to the satellites 30.

The orbit control command generation unit 510 and the analytical prediction unit 520 implement the function of the satellite constellation forming unit 11. That is, the orbit control command generation unit 510 and the analytical prediction unit 520 are examples of the satellite constellation forming unit 11.

Figure 8:
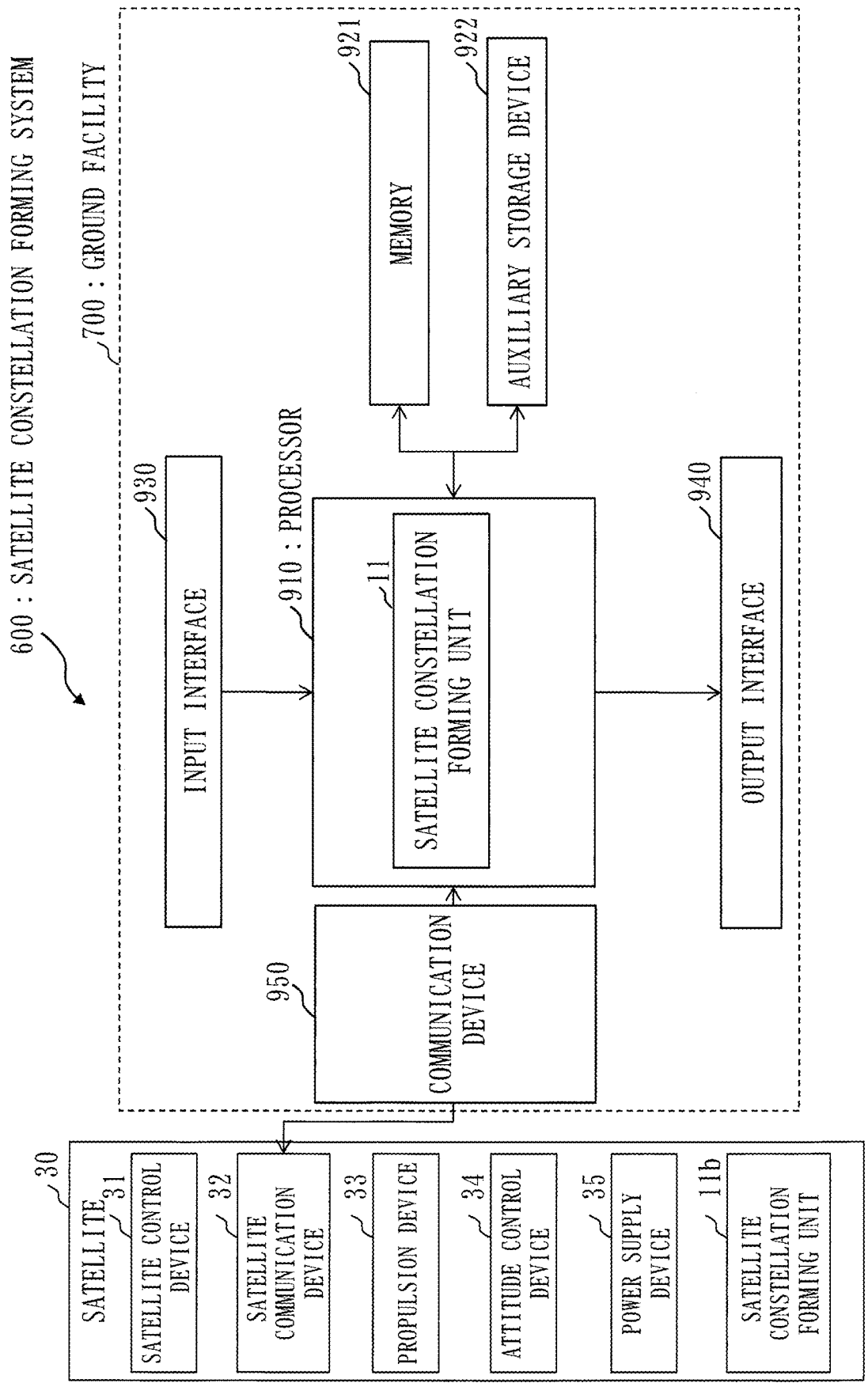
FIG. 8 presents a function configuration example of the satellite constellation forming system.

FIG. 8 is a diagram illustrating a function configuration example of the satellite constellation forming system 600.

The satellite 30 is further provided with a satellite constellation forming unit 11b which forms the satellite constellation 20. The satellite constellation forming units 11b of the individual satellites 30 of the plurality of satellites and the satellite constellation forming unit 11 provided to the ground facility 700 cooperate with each other to implement the functions of the satellite constellation forming system 600. Alternatively, the satellite constellation forming unit 11b of the satellite 30 may be provided to the satellite control device 31.

Description of Configurations

A space traffic management system 500 according to the present embodiment is provided with a collision avoidance assist business device 43 and a plurality of mega-constellation business devices 41. The collision avoidance assist business device 43 assists avoidance of collision of space objects with each other in outer space. The mega-constellation business devices 41 manage mega-constellations which are satellite constellations each consisting of 100 or more satellites.

The space traffic management device 100 according to the present embodiment is mounted in the collision avoidance assist business device 43 and in each of the plurality of mega-constellation business devices 41, and is provided with a database 211 and a server 212. A space traffic management device 100 may be mounted in a space insurance business device 47 of a space insurance business operator which runs a space insurance business.

In the space traffic management system 500, the space traffic management devices 100 individually mounted in the collision avoidance assist business device 43, the plurality of mega-constellation business devices 41, and the space insurance business device 47 are connected to each other via a communication line.

Figure 9:
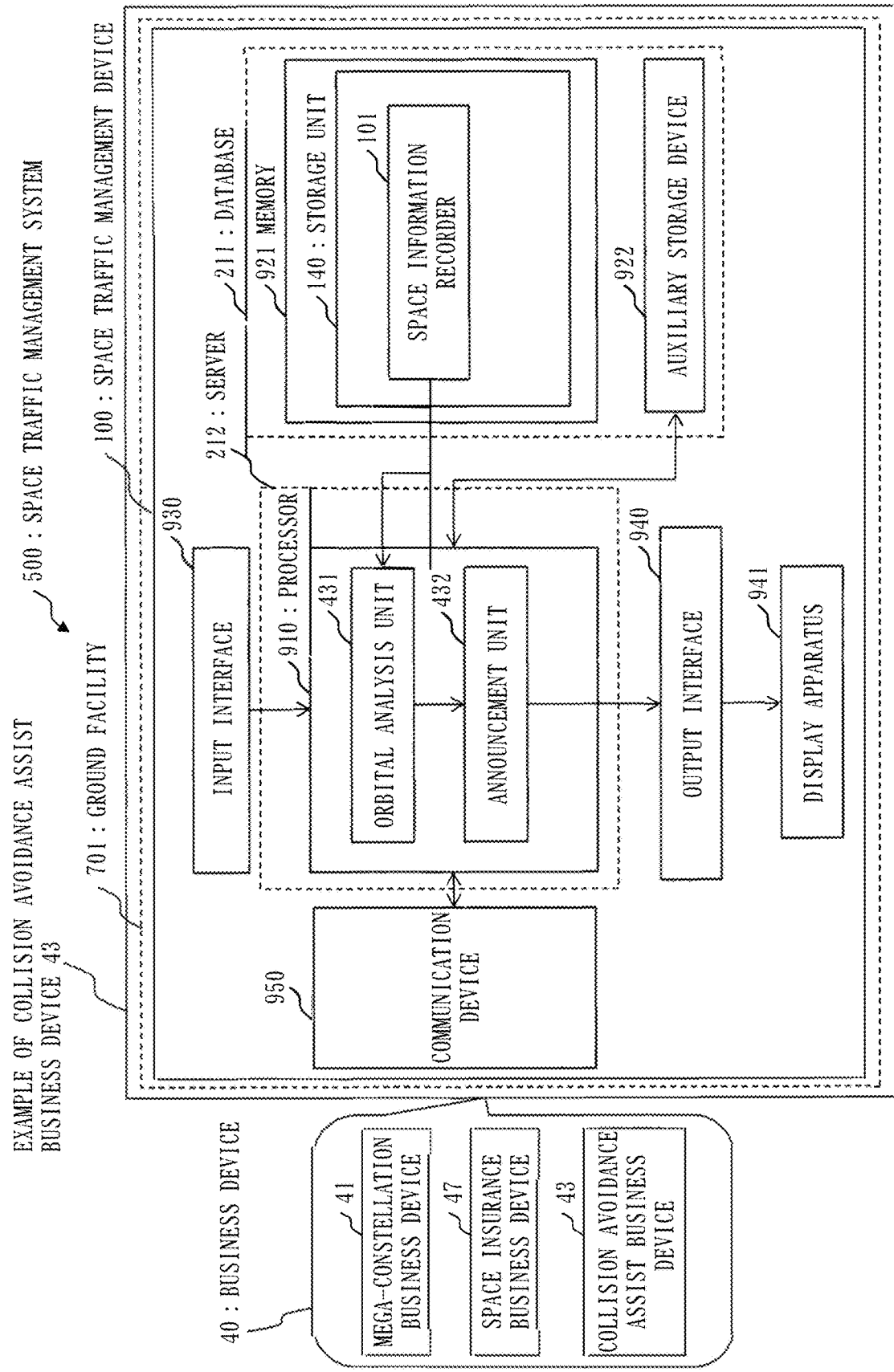
FIG. 9 presents a hardware configuration example of a space traffic management device of a collision avoidance assist business device according to Embodiment 1.

FIG. 9 is a diagram illustrating a hardware configuration example of the space traffic management device 100 of the collision avoidance assist business device 43 according to the present embodiment.

Figure 10:
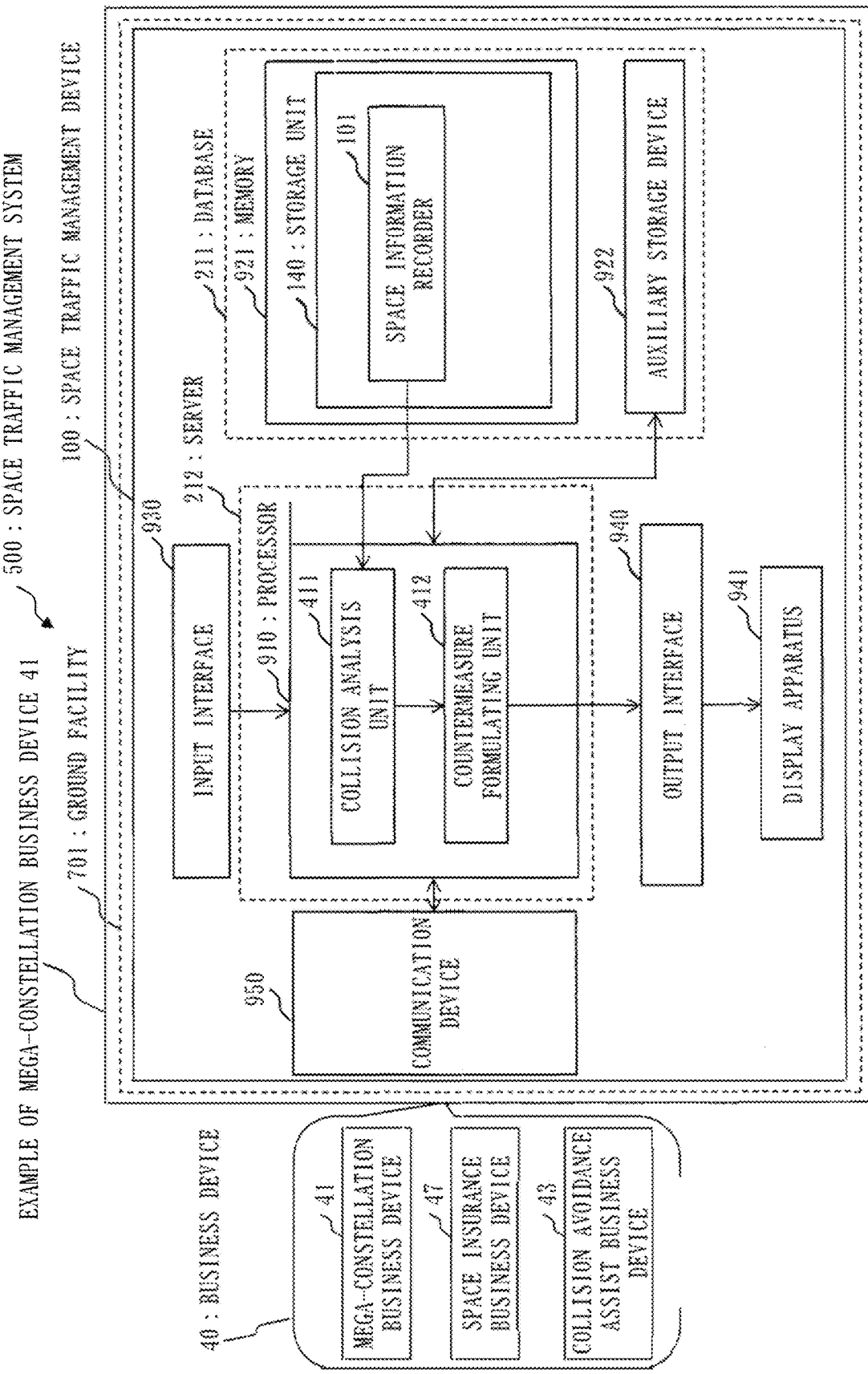
FIG. 10 presents a hardware configuration example of a space traffic management device of a mega-constellation business device according to Embodiment 1.

FIG. 10 is a diagram illustrating a hardware configuration example of the space traffic management device 100 of the mega-constellation business device 41 according to the present embodiment.

In the present embodiment, the space traffic management device 100 is mounted in each of the plurality of mega-constellation business devices 41, the space insurance business device 47, and the collision avoidance assist business device 43.

The mega-constellation business device 41 manages the satellite constellation consisting of a plurality of satellites. Specifically, the mega-constellation business device 41 is a computer of a mega-constellation business operator which runs a large-scale satellite constellation business, that is, a mega-constellation business. The mega-constellation business device 41 is an example of a satellite constellation business device that manages a satellite constellation consisting of, for example, 100 or more satellites.

The collision avoidance assist business device 43 assists avoidance of collision of space objects with each other in outer space. Specifically, the collision avoidance assist business device 43 is a computer of a collision avoidance assist business operator which assists avoidance of collision of space objects with each other in outer space.

The business devices 40 may include business devices such as an LEO constellation business device, a satellite business device, an orbital transfer business device, a debris removal business device, a rocket launch business device, and a space situational awareness (SSA) business device, in addition to the mega-constellation business devices 41, the space object business device 42, and the collision avoidance assist business device 43.

Each business device 40 provides information concerning the space object 60 such as an artificial satellite managed by each device, and debris. The business device 40 is a computer of a business operator which collects information concerning the space object 60 such as the artificial satellite and debris.

The LEO constellation business device is a computer of an LEO constellation business operator which runs a low-Earth-orbit constellation business, that is, an LEO constellation business.

The satellite business device is a computer of a satellite business operator which deals with one to several satellites.

The orbital transfer business device is a computer of an orbital transfer business operator which issues a space object intrusion alarm about a satellite.

The debris removal business device is a computer of a debris removal business operator which runs a debris removal business.

The rocket launch business device is a computer of the rocket launch business operator which runs the rocket launch business.

The SSA business device is a computer of an SSA business operator which runs an SSA business, that is a space situational awareness business.

A space traffic management device 100 may be mounted in a ground facility 701 provided to each business device 40. A space traffic management device 100 may be mounted in the satellite constellation forming system 600.

The space traffic management device 100 is provided with a processor 910, and is provided with other hardware devices as well, such as a memory 921, an auxiliary storage device 922, an input interface 930, an output interface 940, and a communication device 950. The processor 910 is connected to the other hardware devices via a signal line and controls the other hardware devices.

The processor 910 is an example of a server. The memory 921 and the auxiliary storage device 922 are examples of the database 211. The server 212 may be provided with other hardware devices such as an input interface 930, an output interface 940, a communication device 950, and a storage apparatus. The server 212 implements individual functions of the mega-constellation business device 41, the space insurance business device 47, and the collision avoidance assist business device 43.

As illustrated in FIG. 9, the space traffic management device 100 of the collision avoidance assist business device 43 is provided with an orbital analysis unit 431, an announcement unit 432, and a storage unit 140, as examples of function elements that implement a collision avoidance assist function. A space information recorder 101 is stored in the storage unit 140.

As illustrated in FIG. 10, the space traffic management device 100 of the mega-constellation business device 41 is provided with a collision analysis unit 411, a countermeasure formulating unit 412, and a storage unit 140, as examples of function elements that implement a mega-constellation management function. A space information recorder 101 is stored in the storage unit 140.

In the following, a hardware configuration of the space traffic management device 100 will be described with referring to FIG. 9, using the space traffic management device 100 of the collision avoidance assist business device 43 as an example. Note that the space traffic management device 100 of another business device 40 has the same hardware configuration.

To simplify the description, a configuration having the same function is denoted by the same reference sign. However, the mega-constellation business device 41, the collision avoidance assist business device 43, and the space insurance business device 47 individually have a hardware configuration and a function configuration, per device.

Functions of the orbital analysis unit 431 and announcement unit 432 are implemented by software. The storage unit 140 is provided to the memory 921. Alternatively, the storage unit 140 may be provided to the auxiliary storage device 922. Also, the storage unit 140 may be divided between the memory 921 and the auxiliary storage device 922.

FIG. 9 describes the space traffic management device 100 as a device that implements a function of collision avoidance assistance. However, the space traffic management device 100 has various functions other than the function of collision avoidance assistance.

The processor 910 is a device that runs a space traffic management program. The space traffic management program is a program that implements the functions of various constituent elements of the space traffic management device 100 and space traffic management system 500.

The processor 910 is an Integrated Circuit (IC) that performs computation processing. Specific examples of the processor 910 are a Central Processing Unit (CPU), a Digital Signal Processor (DSP), and a Graphics Processing Unit (GPU).

The memory 921 is a storage device that stores data temporarily. A specific example of the memory 921 is a Static Random-Access Memory (SRAM) or a Dynamic Random-Access Memory (DRAM).

The auxiliary storage device 922 is a storage device that keeps data. A specific example of the auxiliary storage device 922 is an HDD. Alternatively, the auxiliary storage device 922 may be a portable storage medium such as an SD (registered trademark) memory card, a CF, a NAND flash, a flexible disk, an optical disk, a compact disk, a Blu-ray (registered trademark) Disc, and a DVD. HDD stands for Hard Disk Drive. SD (registered trademark) stands for Secure Digital. CF stands for CompactFlash (registered trademark). DVD stands for Digital Versatile Disk.

The input interface 930 is a port to be connected to an input device such as a mouse, a keyboard, and a touch panel. The input interface 930 is specifically a Universal Serial Bus (USB) terminal. Alternatively, the input interface 930 may be a port to be connected to a Local Area Network (LAN).

The output interface 940 is a port to which a cable of a display apparatus 941 such as a display is to be connected. The output interface 940 is specifically a USB terminal or a High-Definition Multimedia Interface (HDMI, registered trademark) terminal. The display is specifically a Liquid Crystal Display (LCD).

The communication device 950 has a receiver and a transmitter. The communication device 950 is specifically a communication chip or a Network Interface Card (NIC). In the present embodiment, the space traffic management devices 100 of the mega-constellation business devices 41, space insurance business device 47, and collision avoidance assist business device 43 communicate with each other via the communication line.

The space traffic management program is read by the processor 910 and run by the processor 910. Not only the space traffic management program but also an Operating System (OS) is stored in the memory 921. The processor 910 runs the space traffic management program while running the OS. The space traffic management program and the OS may be stored in the auxiliary storage device 922. The space traffic management program and the OS which are stored in the auxiliary storage device 922 are loaded into the memory 921 and run by the processor 910. Part or a whole of the space traffic management program may be built in the OS.

The space traffic management device 100 may be provided with a plurality of processors that substitute for the processor 910. The plurality of processors share running of the program. Each processor is a device that runs the program, just as the processor 910 does.

Data, information, signal values, and variable values which are used, processed, or outputted by the program are stored in the memory 921, the auxiliary storage device 922, or a register or cache memory in the processor 910.

The term "unit" in each unit of the space traffic management device may be replaced by "process", "procedure", "means", "phase", or "stage". The term "process" in an orbital analysis process and in an alarming process may be replaced by "program", "program product", or "program-recorded computer-readable recording medium" recorded with a program. The terms "process", "procedure", "means", "phase", and "stage" are replaceable with one another.

The space traffic management program causes the computer to execute processes, procedures, means, phases, or stages corresponding to the individual units in the space traffic management system, with the "units" being replaced by "processes", "procedures", "means", "phases", or "stages". A space traffic management method is a method that is carried out by the space traffic management device 100 running the space traffic management program.

The space traffic management program may be provided as being stored in a computer-readable recording medium. Each program may be provided in the form of a program product.

FIG. 11 is a diagram illustrating an example of orbit prediction information 51 provided to the space information recorder 101 according to the present embodiment.

The space traffic management device 100 stores, to the storage unit 140, the orbit prediction information 51 in which prediction values of the orbit of the space object 60 are set. For example, the space traffic management device 100 may acquire prediction values of orbits of a plurality of space objects 60 from the business device 40 utilized by a management business operator which manages the plurality of space objects 60, and may store the prediction values as orbit prediction information 51. Alternatively, the space traffic management device 100 may acquire, from the management business operator, orbit prediction information 51 in which prediction values of orbits of a plurality of space objects 60 are set, and may store the acquired orbit prediction information 51 to the storage unit 140.

The management business operator is a business operator that manages the space object 60 such as a satellite constellation, various types of satellites, a rocket, and debris, which fly in space. As described above, the management business device 40 utilized by each management business operator is a computer such as the mega-constellation business device, the LEO constellation business device, the satellite business device, the orbital transfer business device, the debris removal business device, the rocket launch business device, and the SSA business device.

The orbit prediction information 51 includes satellite orbit prediction information 52 and debris orbit prediction information 53. Prediction values of an orbit of a satellite are set in the satellite orbit prediction information 52. Prediction values of an orbit of debris are set in the debris orbit prediction information 53. In the present embodiment, the satellite orbit prediction information 52 and the debris orbit prediction information 53 are included in the orbit prediction information 51. However, the satellite orbit prediction information 52 and the debris orbit prediction information 53 may be stored in the storage unit 140 as different pieces of information.

Information such as, for example, a space object Identifier (ID) 511, a predicted epoch 512, predicted orbital elements 513, and predicted errors 514 are set in the orbit prediction information 51.

The space object ID 511 is an identifier that identifies a space object 60. In FIG. 11, a satellite ID and a debris ID are set as the space object ID 511. The space object is specifically an object such as a rocket to be launched to outer space, an artificial satellite, a space base, a debris removal satellite, a planetary space probe, and a satellite or rocket that turned into debris after a mission is completed.

The predicted epoch 512 is an epoch predicted for an orbit of each of the plurality of space objects.

The predicted orbital elements 513 are orbital elements that identify an orbit of each of the plurality of space objects. The predicted orbital elements 513 are orbital elements predicted for the orbit of each of the plurality of space objects. In FIG. 11, Keplerian six orbital elements are set as the predicted orbital elements 513.

The predicted errors 514 are errors predicted for an orbit of each of the plurality of space objects. A traveling-direction error, an orthogonal-direction error, and an error basis are set in the predicted errors 514. In this manner, error amounts involved in performance values are explicitly indicated in the predicted errors 514, together with their bases. The bases of the error amounts include contents of data processing carried out as a measurement means and as an accuracy improving means of position coordinate information, and part or a whole of statistic evaluation results of past data.

In the orbit prediction information 51 according to the present embodiment, the predicted epoch 512 and the predicted orbital elements 513 are set concerning the space object 60. A time and position coordinates of the space object 60 in the near future can be obtained from the predicted epoch 512 and the predicted orbital elements 513. For example, the time and position coordinates of the space object 60 in the near future may be set in the orbit prediction information 51.

In this manner, the orbit prediction information 51 is provided with orbital information of the space object, including the epoch and the orbital elements or the time and the position coordinates, to explicitly indicate predicted values of the space object 60 in the near future.

Description of Functions

<Necessity for Space Traffic Management System 500 according to Present Embodiment>

A necessity for the space traffic management system 500 according to the present embodiment will be described with referring to FIGS. 12 through 18.

FIG. 12 is a diagram of a business example of a mega-constellation which is currently under planning.

FIG. 13 is a diagram illustrating intrusion of a new launch rocket into mega-constellation satellite groups according to the present embodiment.

Figure 14:
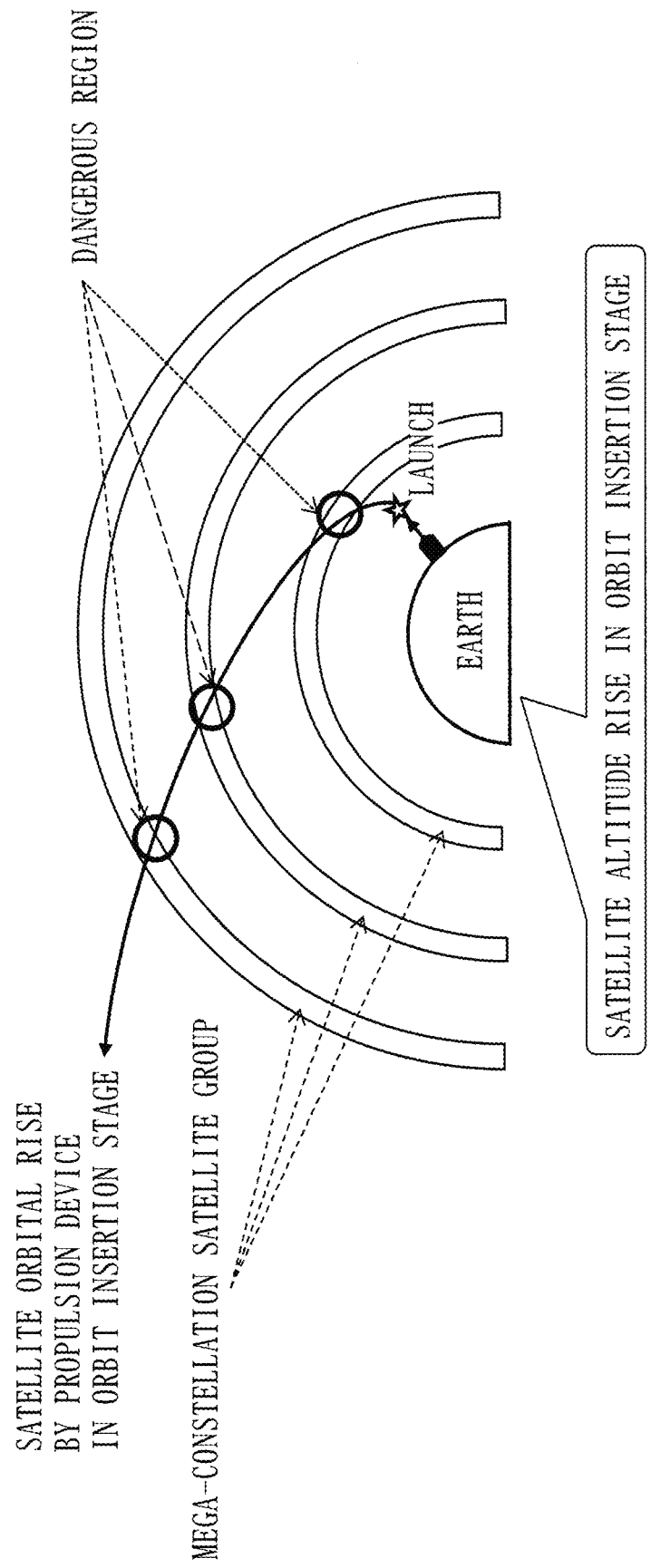
FIG. 14 is a diagram illustrating intrusion of a satellite at an orbit insertion stage into mega-constellation satellite groups according to Embodiment 1.

FIG. 14 is a diagram illustrating intrusion of a satellite at an orbit insertion stage into mega-constellation satellite groups according to the present embodiment.

Figure 15:
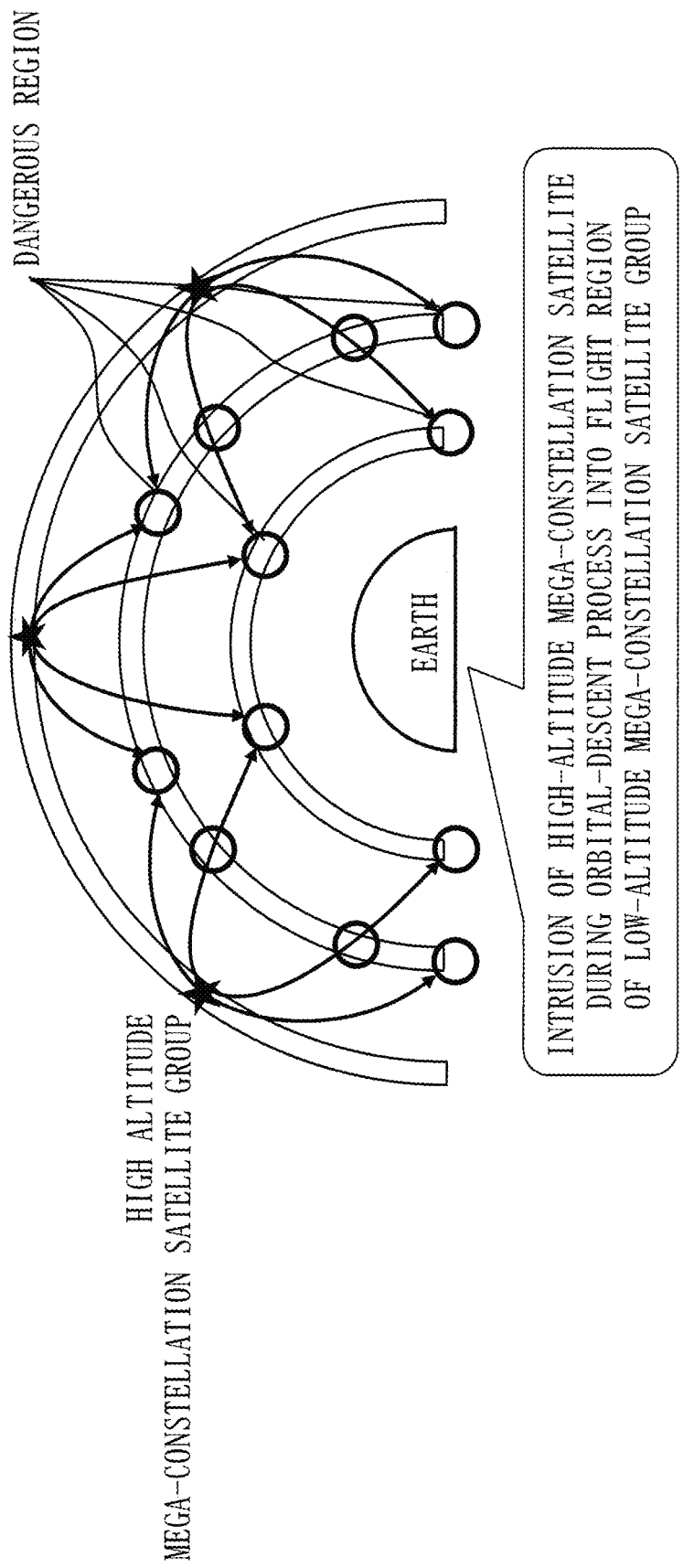
FIG. 15 is a diagram illustrating intrusion of a satellite at an orbital descent stage into mega-constellation satellite groups according to Embodiment 1.

FIG. 15 is a diagram illustrating intrusion of a satellite at an orbital descent stage into mega-constellation satellite groups according to the present embodiment.

As illustrated in FIG. 12, a plurality of mega-constellation business operators advocate a project of deploying many, several hundred to several ten-thousand satellites as if to exhaustively cover the sky.

At the present stage, a mega-constellation business operator A has already announced a deployment project involving about 42,000 satellites, a mega-constellation business operator B has announced a deployment project involving about 3,000 satellites, and a mega-constellation business operator C has announced a deployment project involving about 600 satellites.

As illustrated in FIG. 13, at the stage of deploying mega-constellation satellite groups, as a total number of satellites deployed on orbits increases, a collision risk during new rocket launch increases.

As illustrated in FIG. 14, some satellite business operators announce a project in which after a rocket is launched and a satellite is disconnected, a propulsion device provided to the satellite raises an altitude of the satellite, thereby performing orbit insertion. This is aimed at reducing a risk that a rocket upper block remains as debris. In this case as well, however, as the total number of satellites deployed on the orbit increases, a collision risk during an orbit insertion process increases.

As illustrated in FIG. 15, a collision risk exists even after each mega-constellation business operator has completed deployment of all satellites and steady operation is started. Specifically, after completion of the satellite life, in a process of orbital disposal by PMD and lowering a trajectory altitude until atmospheric entry, a risk exists that a satellite at an orbital descent stage collides with a mega-constellation satellite group that is in steady operation.

In this manner, a space object such as an unsteadily-operation satellite and a rocket poses a collision risk against a mega-constellation satellite group which is deployed as if to exhaustively cover the sky and performs steady operation.

Figure 16:
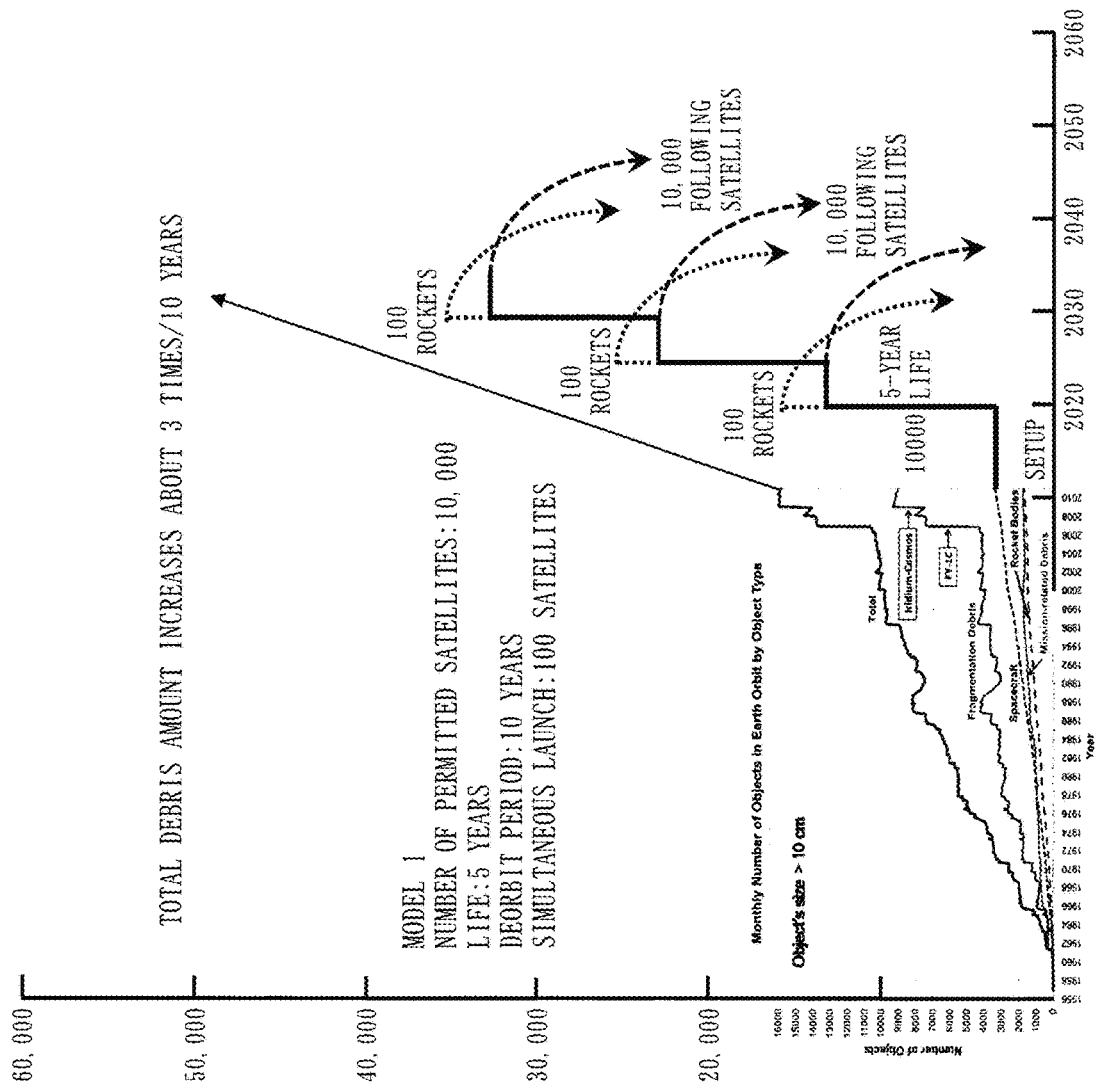
FIG. 16 presents an example of a change in a number of on-orbit objects of a mega-constellation satellite group according to Embodiment 1.

FIG. 16 is a diagram illustrating an example of a change in a number of on-orbit objects in a mega-constellation satellite group according to the present embodiment.

As illustrated in FIG. 16, at a terminal period of a design life, a satellite to follow a satellite that has been performing steady operation so far must be put into orbit in order to continue the service. Accordingly, the number of on-orbit objects multiplies in a generation shift process. Also, if a deorbit period taken until atmospheric entry after PMD is longer than a satellite life, the total number of on-orbit objects further increases during generation shift. Hence, it is worried that the total number of on-orbit objects including currently recognized debris may swell by several times.

Assume that in a mega-constellation satellite group, a satellite group consisting of up to several thousand satellites flies on the same orbit, as illustrated in FIG. 3. On a polar orbit having an orbital inclination of almost 90°, a satellite density is high in polar regions where all orbital planes meet. Therefore, the mega-constellation business device 41 must conduct strict passing timing control for ensuring flight safety.

Meanwhile, as illustrated in FIG. 4, on an inclined orbit having an orbital inclination far from 90°, a collision risk exists at an orbital-plane intersection in a middle-latitude region. Therefore, to ensure flight safety by shifting a satellite passing timing at every lattice intersection, the mega-constellation business device 41 must conduct strict passing timing control.

In this manner, in order to realize strict passing timing control, the individual satellite groups fly while constantly operating the propulsion devices 33.

A procedure of ensuring flight safety requires performing danger analysis first of all, such as approach analysis and collision analysis. To perform high-accuracy danger analysis, high-accuracy orbital information of a space object is indispensable.

As described above, however, in mega-constellation satellite groups, the individual satellite groups fly while constantly operating the propulsion devices, in order to realize strict passing timing control. Hence, accurate position information cannot be grasped unless the orbital information is updated in a real-time manner. It is rational to consider that it is only mega-constellation business operators which manage individual mega-constellation satellite groups that can manage real-time high-accuracy orbital information of several hundred to several ten-thousand satellites.

Furthermore, it is supposed to be difficult to share real-time high-accuracy orbital information among different business operators.

In view of this, it is rational to proceed as follows. Information of a region where the mega-constellation satellite group flies is disclosed and shared, instead of the real-time high-accuracy orbital information of the individual satellites of the mega-constellation satellite group at a steady operation stage. After the information of the region where the mega-constellation satellite group flies is disclosed and shared, if passing of an unsteady space object is predicted, information of this passing is shared among stakeholders as a danger alarm. Then, high-accuracy orbital information of the unsteady space object is transmitted to the mega-constellation business operator that is in steady operation. The mega-constellation business operator itself which manages the real-time high-accuracy orbital information of the mega-constellation satellite group performs danger analysis.

It is assumed that as the number of on-orbit objects including those from generation shift of the mega-constellation satellite group increases greatly, the number of space objects in the orbit insertion stage and deorbit stage will increase greatly. Hence, it is assumed that a collision avoidance assist business will also appear which manages and shares these pieces of information among the stakeholders, performs danger analysis, and announces a danger alarm. It would be possible that an SSA business operator takes charge of this role.

In the procedure of ensuring flight safety, a collision avoidance countermeasure is particularly important when a danger of collision is predicted. A geostationary-orbit satellite conventionally avoids collision by operating its own propulsion device in response to a danger alarm from CSpOC.

However, since the mega-constellation satellite group is under strict timing management as described above, the safety is not always guaranteed by a collision avoidance action of an individual satellite alone. This is because as a result of the avoidance action, a risk of collision with another satellite arises.

Hence, for avoiding collision with an individual satellite, sometimes it may be rational to take a collision avoidance action by synchronously controlling part or a whole of the mega-constellation satellite group.

There is also a possibility that an unstably operating space object takes an avoidance action. However, there may be a case where the unsteady-operation space object is not provided with a propulsion device, or is not provided with an avoidance action function because, for example, a provided propulsion device is function-suspended or has failed.

In rocket launch, it is possible to take a collision avoidance countermeasure of optimizing a launch timing. However, real-time high-accuracy orbital information of the mega-constellation satellite group is indispensable even when optimizing the launch timing. Furthermore, it is almost impossible to set a launch timing that guarantees flight safety for all of a plurality of mega-constellation satellite groups.

Figure 17:
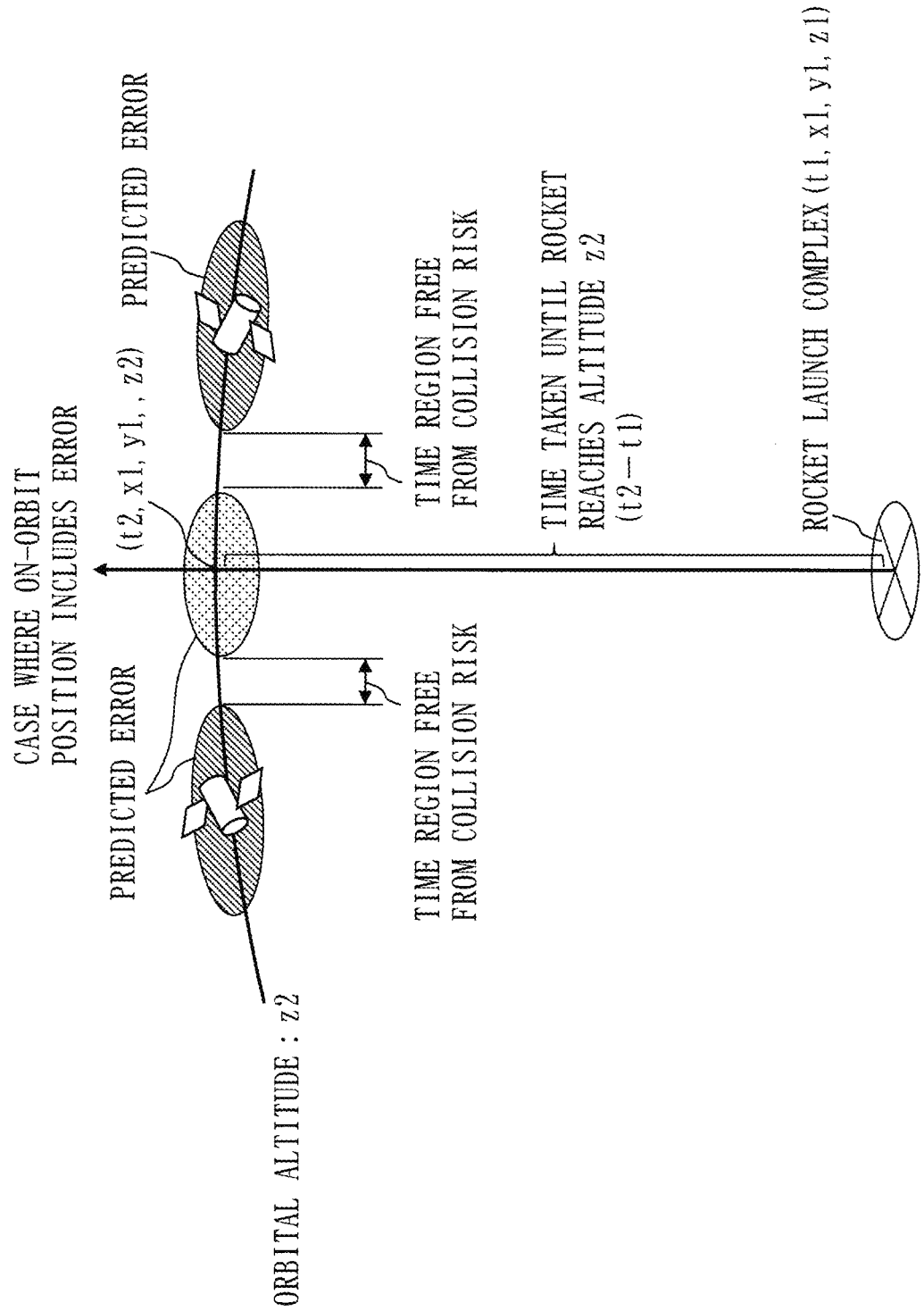
FIG. 17 presents an example of launching a rocket to a region of a mega-constellation satellite group according to Embodiment 1.

FIG. 17 is a diagram illustrating an example of launching a rocket to a region of a mega-constellation satellite group according to the present embodiment.

Figure 18:
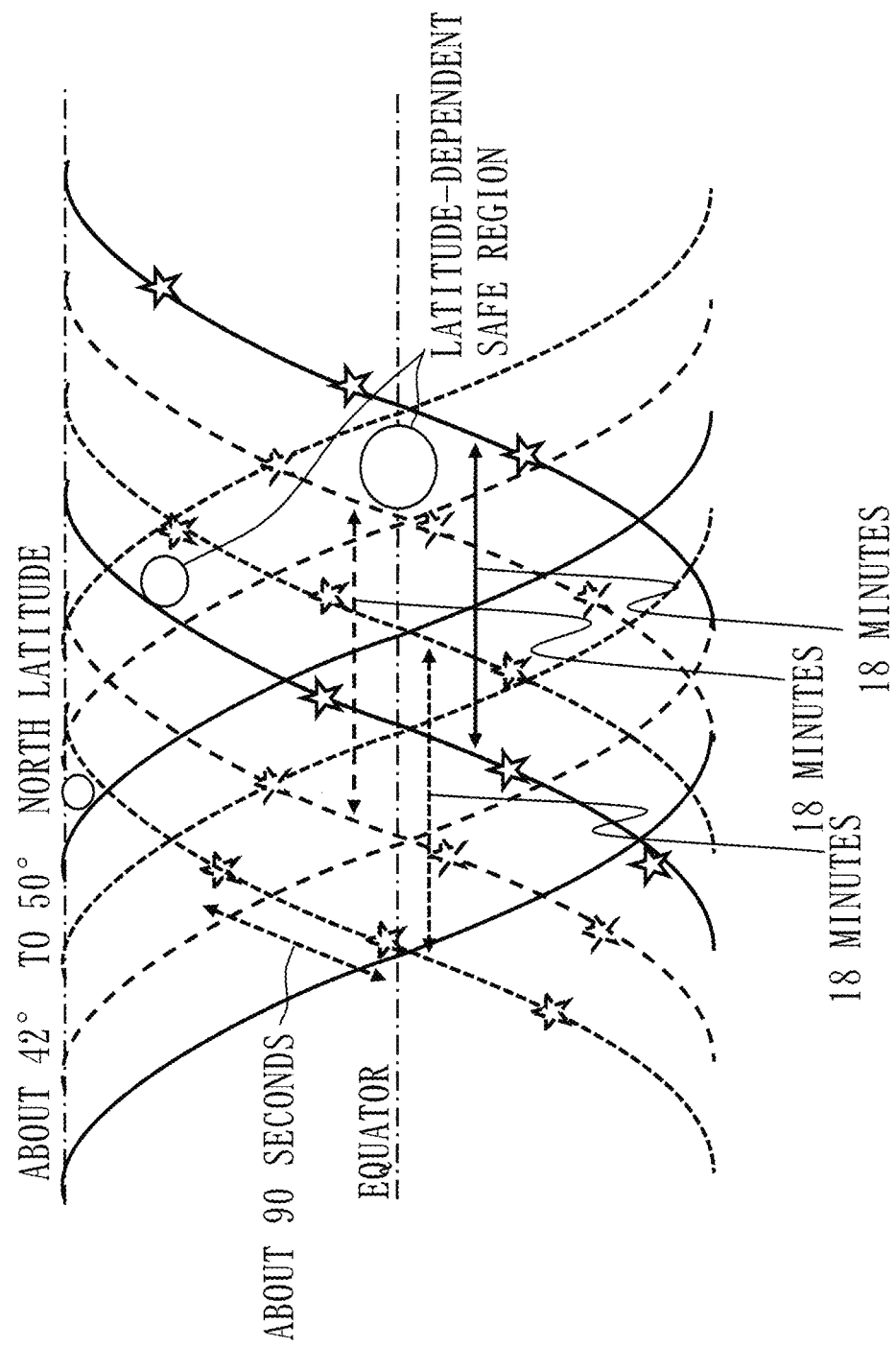
FIG. 18 presents an example of a flight image of a mega-constellation satellite group near an altitude of 340 km according to Embodiment 1.

FIG. 18 is a diagram illustrating an example of a flight image of a mega-constellation satellite group near an altitude of 340 km according to the present embodiment. FIG. 18 illustrates an example of a safe region in rocket launch.

There is a mega-constellation business operator that proclaims being provided with an automatic collision preventive function. However, as a method of practicing the automatic collision preventive function or its algorithm is not disclosed, it is difficult for a third party to estimate behavior of satellites of that mega-constellation business operator.

As described above, in a stage of launching individual satellites constituting the mega-constellation satellite group and deploying the individual satellites on orbits, the satellites must pass through an orbital-altitude region where a mega-constellation satellite group managed by another business operator flies. Furthermore, in a deorbit period after completion of a mission on an orbit until atmospheric entry, the satellites must pass through an orbital-altitude region where the mega-constellation satellite group managed by another business operator flies.

Therefore, a framework is required that enables mega-constellation business operators to avoid satellite collision with each other at an unsteady operation stage such as orbit insertion and orbital disposal so that flight safety is ensured.

Many mega-constellation business operators are, so to speak, in the same boat. For each mega-constellation business operator, another mega-constellation business operator exists in both at a higher altitude and a lower altitude than its own system. In such a case, a contradictory situation occurs which involves a risk that a high-altitude satellite in deorbiting might intrude into a lower-altitude flight region of another business operator, and a risk that a new satellite being put into orbit by rocket launch might intrude into a higher-altitude flight region of another business operator.

In the example of FIG. 12, for each of the mega-constellation business operators A, B, and C, a satellite group of another business operator exists at a higher altitude than its own satellite group, and a satellite group of another business operator exists at a lower altitude than its own satellite group.

Therefore, which is the offender and which is the casualty cannot be one-sidedly determined with respect to a responsibility for avoiding collision when an unsteady space object intrudes into a steady operation orbit and with respect to an accountability for an accident in the event of collision. The positions of the business operator A, the business operator B, and the business operator C can be reversed anytime. Hence, without a framework where a plurality of mega-constellation business operators can coexist and prosper together, it is difficult to guarantee sustainability of mega-constellation businesses.

As a feature of a mega-constellation, quite a large number of satellites fly in the same-orbit altitude zone. Therefore, a high risk of a collision accident leading to chained collision must be considered.

It is very dangerous if a mega-constellation operator believes that "even if some out of many satellites fail, there is no problem because the service as a satellite group can be continued". Business operators should address collision avoidance considering that the whole space business will be suspended if chained collision does not stop to cause a Kessler syndrome.

In view of the above situation, in the present embodiment, orbital information of the mega-constellation satellite group at the steady operation stage and space object information at the unsteady operation stage are shared among business devices of related stakeholders. Then, the collision avoidance assist business device or the SSA business device announces a danger alarm, and the steady-operation mega-constellation business device side carries out danger analysis using the real-time high-accuracy orbital information. When a danger of collision is predicted, the steady operation mega-constellation business device formulates a collision avoidance action plan and shares information of the plan with the business devices of the related stakeholders.

At first glance, the unsteady space object side seems to be a "troubling side", and the steady operation mega-constellation side seems to be a "troubled side". However, since the mega-constellation business operators which are in the same boat are faced with the same problem, they should cooperate to realize a space traffic management system that ensures flight safety.

This situation is commonly observed anywhere in the world regardless of a difference in position such as a company, a nation, and a race or ethnic group. It is expected that even a mega-constellation concept that is currently unknown is to realize a space traffic management system having the same scheme so that coexistence and co-prosperity and conservation of space environment as a public good are achieved.

<Function of Space Traffic Management System 500>

Function configuration examples of the space traffic management system 500 according to the present embodiment will now be described with referring to FIGS. 19 to 21. The hardware configurations of the individual space traffic management devices 100 have been described above.

The plurality of space traffic management devices 100 provided to the space traffic management system 500 are connected to each other via a communication line 200. The space traffic management devices 100 are individually provided to the plurality of mega-constellation business devices 41 and the collision avoidance assist business device 43. FIG. 19 illustrates mega-constellation business devices A and B as the plurality of mega-constellation business devices 41.

Figure 19:
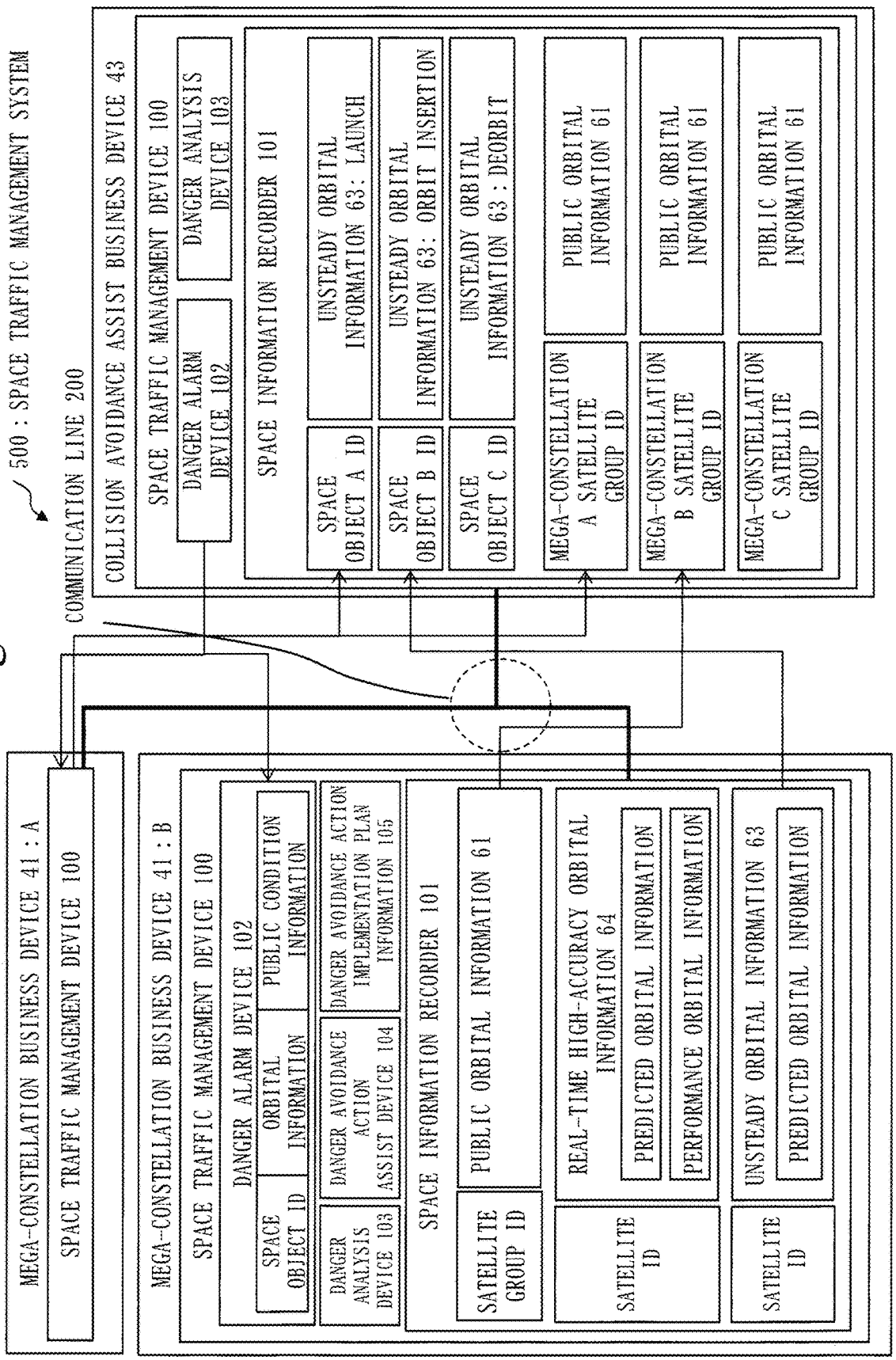
FIG. 19 presents an overall configuration of an example of a space traffic management system according to Embodiment 1.

FIG. 19 is a diagram illustrating an overall configuration example of the space traffic management system 500 according to the present embodiment.

Figure 20:
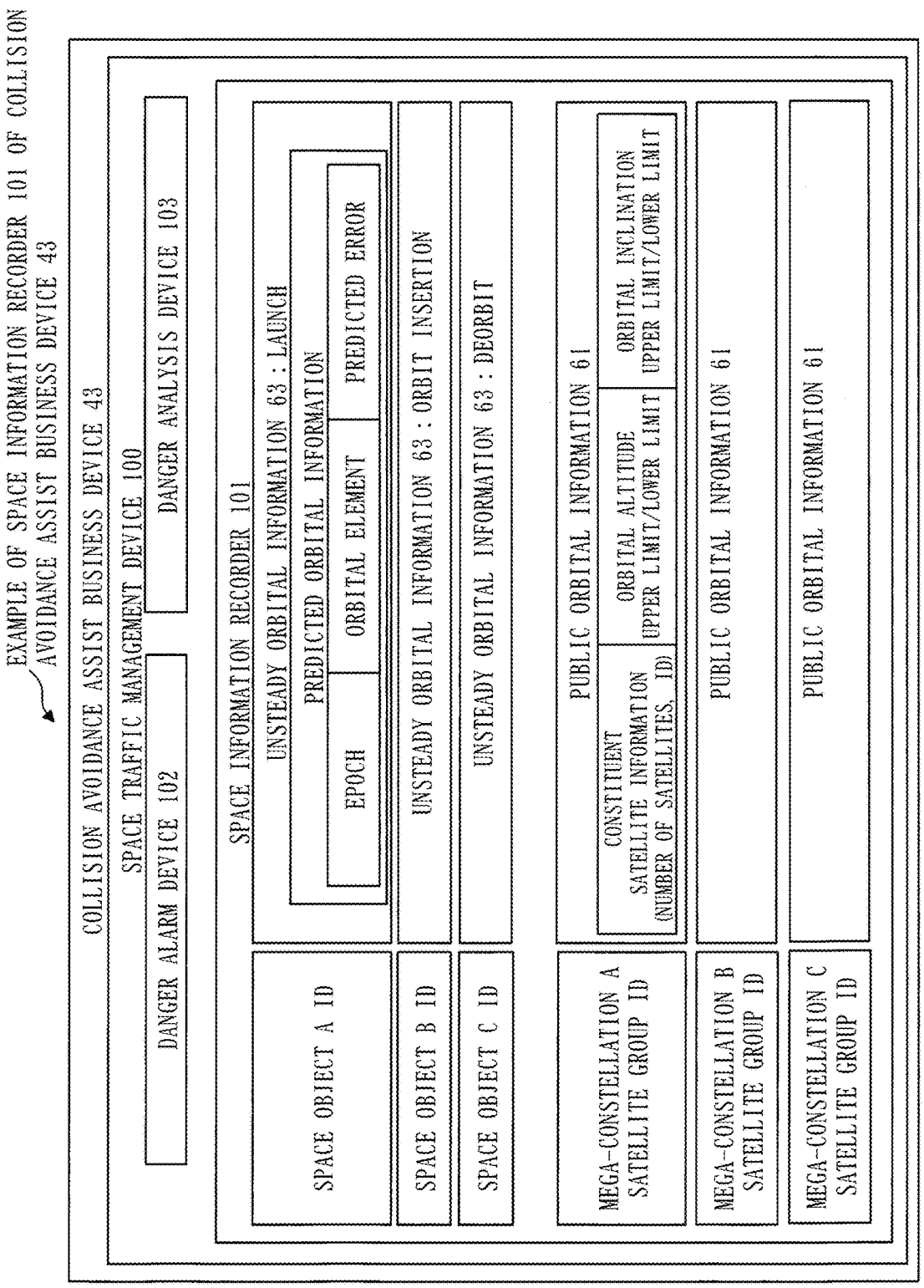
FIG. 20 presents a detailed configuration example of a space information recorder of the collision avoidance assist business device according to Embodiment 1.

FIG. 20 is a diagram illustrating a detailed configuration example of the space information recorder 101 of the collision avoidance assist business device 43 according to the present embodiment.

FIG. 21 is a diagram illustrating a detailed configuration example of the space information recorder 101 of the mega-constellation business device 41 according to the present embodiment.

FIG. 19 illustrates the configuration in detail of the space traffic management device 100 of only the mega-constellation business device B. However, the mega-constellation business devices A and the mega-constellation business device B have space traffic management devices 100 of the same configuration.

FIG. 21 illustrates the space information recorder 101 of the mega-constellation business device B.

<Mega-Constellation Business Device 41>

The space traffic management device 100 of the mega-constellation business device 41 is provided with the space information recorder 101, a danger alarm device 102, a danger analysis device 103 which performs orbital analysis of a space object, a danger avoidance action assist device 104, and a danger avoidance action implementation plan information 105.

The space information recorder 101 of the mega-constellation business device 41 records orbital information of satellites constituting a mega-constellation.

The space information recorder 101 is provided with public orbital information 61 associated with a satellite group ID that identifies a satellite group, and real-time high-accuracy orbital information 64 associated with a satellite ID that identifies a satellite. The space information recorder 101 is also provided with unsteady orbital information 63 associated with a satellite ID that identifies an unsteady-operation satellite.

The public orbital information 61 is orbital information that can be disclosed to the other business devices. Constituent satellite information such as a number of satellites constituting the satellite group and satellite IDs of the satellites, an upper limit and lower limit of an orbital altitude of the satellite group, and an upper limit and lower limit of an orbital inclination of the satellite group are set in the public orbital information 61.

The real-time high-accuracy orbital information 64 consists of predicted orbital information and performance orbital information of each of the satellites constituting the satellite group. A specific example of the predicted orbital information is the orbit prediction information 51 of FIG. 11.

The danger alarm device 102 announces approach or danger of collision of a space object. The danger alarm device 102 is provided with orbital information associated with a space object ID that identifies a space object. The danger alarm device 102 is also provided with public condition information in which a public condition of the orbital information is set.

The danger analysis device 103 performs orbital analysis of the space object. For example, the danger analysis device 103 is an example of the collision analysis unit 411 that analyzes collision of an unsteady-operation space object with an individual satellite constituting a mega-constellation satellite group. That is, the server 212 provided to the space traffic management device 100 of the mega-constellation business device 41 analyzes collision of the unsteady-operation space object with the individual satellite constituting the mega-constellation satellite group.

The danger avoidance action assist device 104 formulates role division of an avoidance action against a space object. For example, the danger avoidance action assist device 104 is an example of the countermeasure formulating unit 412 that formulates a collision avoidance countermeasure when collision of a mega-constellation with an unsteady-operation space object is predicted. That is, the server 212 provided to the space traffic management device 100 of the mega-constellation business device 41 formulates a collision avoidance countermeasure when collision is predicted.

An avoidance action plan formulated by the danger avoidance action assist device 104 is set in the danger avoidance action implementation plan information 105.

The predicted orbital information and the performance orbital information are set in the real-time high-accuracy orbital information 64 to correspond to the satellite ID. The predicted orbital information and the performance orbital information are set in a real-time manner and accurately.

Predicted orbital information about a space object which performs unsteady operation in an own mega-constellation is set in the unsteady orbital information 63. An epoch, orbital elements, and predicted errors are set in the predicted orbital information, as in FIG. 11.

<Collision Avoidance Assist Business Device 43>

The space traffic management device 100 of the collision avoidance assist business device 43 is provided with a space information recorder 101, a danger alarm device 102, and a danger analysis device 103.

The database 211 provided to the space traffic management device 100 of the collision avoidance assist business device 43 records orbital information, acquired from the plurality of mega-constellation business devices 41, of the mega-constellation satellite group during steady operation, and orbital information of the unsteady-operation space object. Specifically, the space information recorder 101 of the collision avoidance assist business device 43 records the public orbital information 61, acquired from the mega-constellation business devices A and B, of the mega-constellation satellite group, and the unsteady orbital information 63 of the unsteady-operation space object.

The public orbital information 61 is orbital information, acquired from the mega-constellation business devices A and B, of the mega-constellation satellite group during steady operation.

The unsteady orbital information 63 is orbital information of the unsteady-operation space object.

FIG. 20 illustrates the configuration in detail of the unsteady orbital information 63 of only the space object A. However, each of space objects B and of C has the same configuration as that of the unsteady orbital information 63. Also, FIG. 20 illustrates the configuration in detail of the public orbital information 61 of only the mega-constellation business device A. However, each of the other mega-constellation satellite groups B and C has the same configuration as this.

In FIG. 20, the collision avoidance assist business device 43 acquires the unsteady orbital information 63 of the mega-constellation satellite group B and the public orbital information 61 of the mega-constellation satellite group B, from the mega-constellation satellite group B. Likewise, the collision avoidance assist business device 43 acquires the unsteady orbital information 63 of the space object A and the public orbital information 61 of the mega-constellation satellite group A, from the mega-constellation satellite group A.

An unsteady-operation space object is an unsteady-operation individual satellite, or a new launch rocket to be launched newly. The unsteady-operation individual satellite includes an individual satellite inserted in an orbit, or an individual satellite that deorbits.

The danger analysis device 103 of the collision avoidance assist business device 43 performs orbital analysis of a space object. The danger analysis device 103 is an example of the orbital analysis unit 431 that identifies a mega-constellation satellite group formed in an orbital altitude which the mega-constellation satellite group is anticipated to pass during a flight of the unsteady-operation space object. That is, the server 212 provided to the space traffic management device 100 of the collision avoidance assist business device 43 identifies a mega-constellation satellite group formed in an orbital altitude which the mega-constellation satellite group is anticipated to pass during a flight of the unsteady-operation space object.

The danger alarm device 102 of the collision avoidance assist business device 43 announces danger of approach or collision of a space object. The danger alarm device 102 is an example of the announcement unit 432 that announces a danger alarm and the unsteady orbital information 63 of an unsteady-operation space object, when it is predicted that an unsteady-operation space object intrudes into an orbital-altitude region where a mega-constellation satellite group flies. That is, the server 212 provided to the space traffic management device 100 of the collision avoidance assist business device 43 announces a danger alarm and orbital information of an unsteady-operation space object to the mega-constellation business device 41 which manages a mega-constellation satellite group.

Description of Operations

Figure 22:
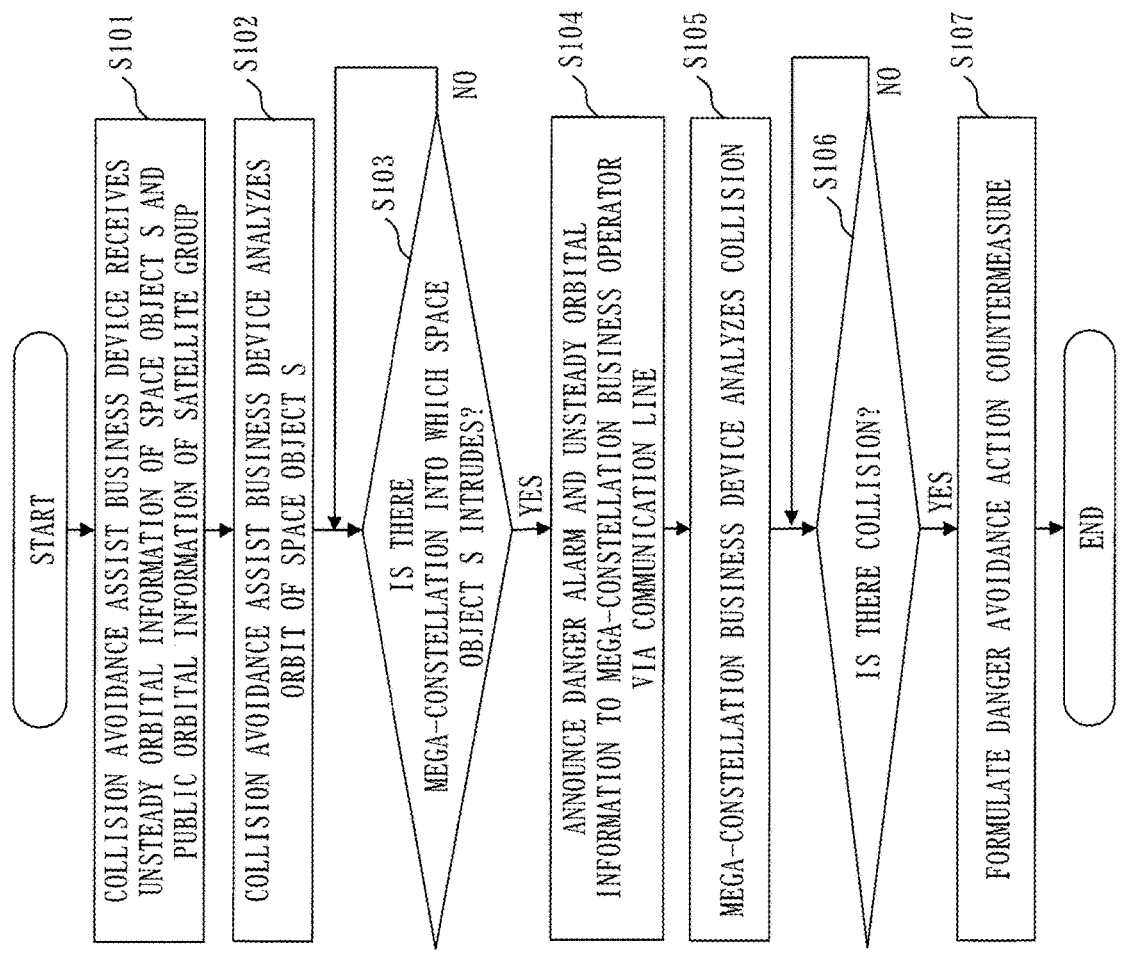
FIG. 22 is a flowchart illustrating a space traffic management process of the space traffic management system according to Embodiment 1.

FIG. 22 is a flowchart illustrating a space traffic management process of the space traffic management system 500 according to the present embodiment. The orbital analysis unit 431 and the announcement unit 432 are provided to the server of the space traffic management device 100 of the collision avoidance assist business device 43. The collision analysis unit 411 and the countermeasure formulating unit 412 are provided to the server of the space traffic management device 100 of the mega-constellation business device 41.

In step S101, the space traffic management device 100 of the collision avoidance assist business device 43 receives the unsteady orbital information 63 of an unsteady-operation space object S and the public orbital information 61 of a mega-constellation satellite group, from the plurality of mega-constellation business devices 41 via the communication line 200. The public orbital information 61 may be recorded in advance in a database of the space traffic management device 100 of the collision avoidance assist business device 43.

The database of the space traffic management device 100 of the collision avoidance assist business device 43 records unsteady orbital information 63 of the steady-operation space object S, and public orbital information 61 in which orbital information or flight region information of the mega-constellation satellite group is set.

In step S102, the orbital analysis unit 431 identifies a mega-constellation satellite group formed in an orbital altitude which the mega-constellation satellite group is anticipated to pass during the flight of the unsteady-operation space object S.

In step S103, if it is predicted that the unsteady-operation space object S intrudes into an orbital altitude region where satellite groups of a mega-constellation fly, the processing proceeds to step S104.

In step S104, the announcement unit 432 announces a danger alarm and the unsteady orbital information 63 of the unsteady-operation space object S, to the mega-constellation business operator via the communication line 200. Specifically, the announcement unit 432 transmits the danger alarm and orbital information of the unsteady-operation space object in the identified mega-constellation satellite group to the space traffic management device 100 of a business operator that is different from the business operator that manages the space object S.

In step S105, the collision analysis unit 411 analyzes collision of the unsteady-operation space object S with an individual satellite constituting the mega-constellation satellite group. The collision analysis unit 411 analyzes collision of the space object S with the individual satellite constituting the mega-constellation satellite group, with using the unsteady orbital information 63 of the space object S and the orbital information of the satellite group which is recorded in the space information recorder 101 of its own device.

In step S106, if collision is predicted, the processing proceeds to step S107. In step S107, the countermeasure formulating unit 412 formulates a collision avoidance countermeasure to avoid collision of the unsteady-operation space object S with the satellite constituting the mega-constellation satellite group. The collision avoidance countermeasure is set in the danger avoidance action implementation plan information 105 of the mega-constellation business device 41.

Regarding the collision avoidance countermeasure, in a case where the unsteady-operation space object S is not provided with a control device or a provided control device has failed, the steady-operation mega-constellation satellite group must take a collision avoidance action. In this case, it is effective to use an effect of the following procedure. All or some of the propulsion devices of the mega-constellation satellite group are operated in a traveling direction to perform acceleration, thereby raising trajectory altitude. As a result, the ground speed decreases and the orbital position change. After the unsteady-operation space object S passes safely, the propulsion devices are operated to achieve propulsion in a direction opposite to the traveling direction. Consequently, the trajectory altitude is lowered and the ground speed increases, so that the mega-constellation satellite group can return to the original flying position.

As described above, the mega-constellation business device performs collision analysis on the basis of an acquired danger alarm, and after collision is predicted, executes a collision avoidance action. In other words, the mega-constellation business device executes a collision avoidance action on the basis of a collision avoidance countermeasure formulated by the space traffic management method of the space traffic management system.

The mega-constellation business operator operates the propulsion devices provided to the individual satellites in order to perform acceleration or deceleration, thereby raising or lowering the trajectory altitude. The mega-constellation business operator sync-controls all the satellite groups having the same nominal orbital altitude so that the satellite groups execute the same operation. Thus, the mega-constellation business operator can execute a collision avoidance action while almost maintaining a relative relationship among mega-constellation satellite groups.

If satellites having orbital planes with normals in different directions fly at the same altitude, there is a risk of collision to occur on an intersection line of the orbital planes within its own system. Hence, the mega-constellation business device is required to perform analysis of collision within its own system and to find an optimum passing timing for risk avoidance. This collision analysis is however difficult for the other business operators to perform.

Another method to implement the collision avoidance action can include a means of sync-controlling only a satellite group on a particular orbital plane to conduct similar operations, or a means of taking a collision avoidance action for only a satellite whose collision is predicted.

Yet, collision analysis for avoiding collision of the mega-constellation satellite groups to occur within its own system is required likewise.

A collision avoidance assist business operator may be an SSA business operator. That is, the collision avoidance assist business device 43 may be an SSA business device utilized by an SSA business operator.

Other Configurations

Description will be made below on functional examples of a space traffic management system in which space traffic management devices individually mounted in a collision avoidance assist business device, a plurality of mega-constellation business devices for managing mega-constellations, and an SSA business device are connected to each other via a communication line.

Functional Example 1

A collision avoidance assist business device performs danger analysis using orbital information, acquired from a first mega-constellation business device, of a mega-constellation satellite group in steady operation, orbital information, acquired from a second mega-constellation business device, of an unsteady-operation individual satellite, or orbital information of a new launch rocket, and announces a danger alarm and orbital information of a space object to the mega-constellation business devices.

Functional Example 2

An SSA business device serves as a collision avoidance assist business device as well. The SSA business device performs danger analysis using orbital information, acquired from a plurality of mega-constellation business devices, of a mega-constellation satellite group in steady operation, orbital information of an unsteady-operation individual satellite, or orbital information of a new launch rocket, and announces a danger alarm and orbital information of a space object to the mega-constellation business devices.

Functional Example 3

A mega-constellation business device discloses orbital information of a mega-constellation satellite group in steady operation to a collision avoidance assist business device or an SSA business device, and acquires a danger alarm and orbital information of a space object from the collision avoidance assist business device or the SSA business device.

Functional Example 4

A mega-constellation business device discloses orbital information of an unsteady-operation individual satellite to a collision avoidance assist business device or an SSA business device, and acquires a danger alarm from the collision avoidance assist business device, another mega-constellation business device, or the SSA business device.

Functional Example 5

A mega-constellation business device discloses orbital information of a new launch rocket to a collision avoidance assist business device or an SSA business device, and acquires a danger alarm from the collision avoidance assist business device, another mega-constellation business device, or the SSA business device.

Functional Example 6

A mega-constellation business device discloses orbital information of an unsteady-operation individual satellite among constituent satellites of a first mega-constellation satellite group of a first mega-constellation business device, or orbital information of a new launch rocket, to a second mega-constellation business device, and acquires a danger alarm from the second mega-constellation business device, a collision avoidance assist business device, or an SSA business device.

In the present embodiment, the functions of the space traffic management device 100 are implemented by software. A modification may be possible in which the functions of the space traffic management device 100 are implemented by hardware.

Figure 23:
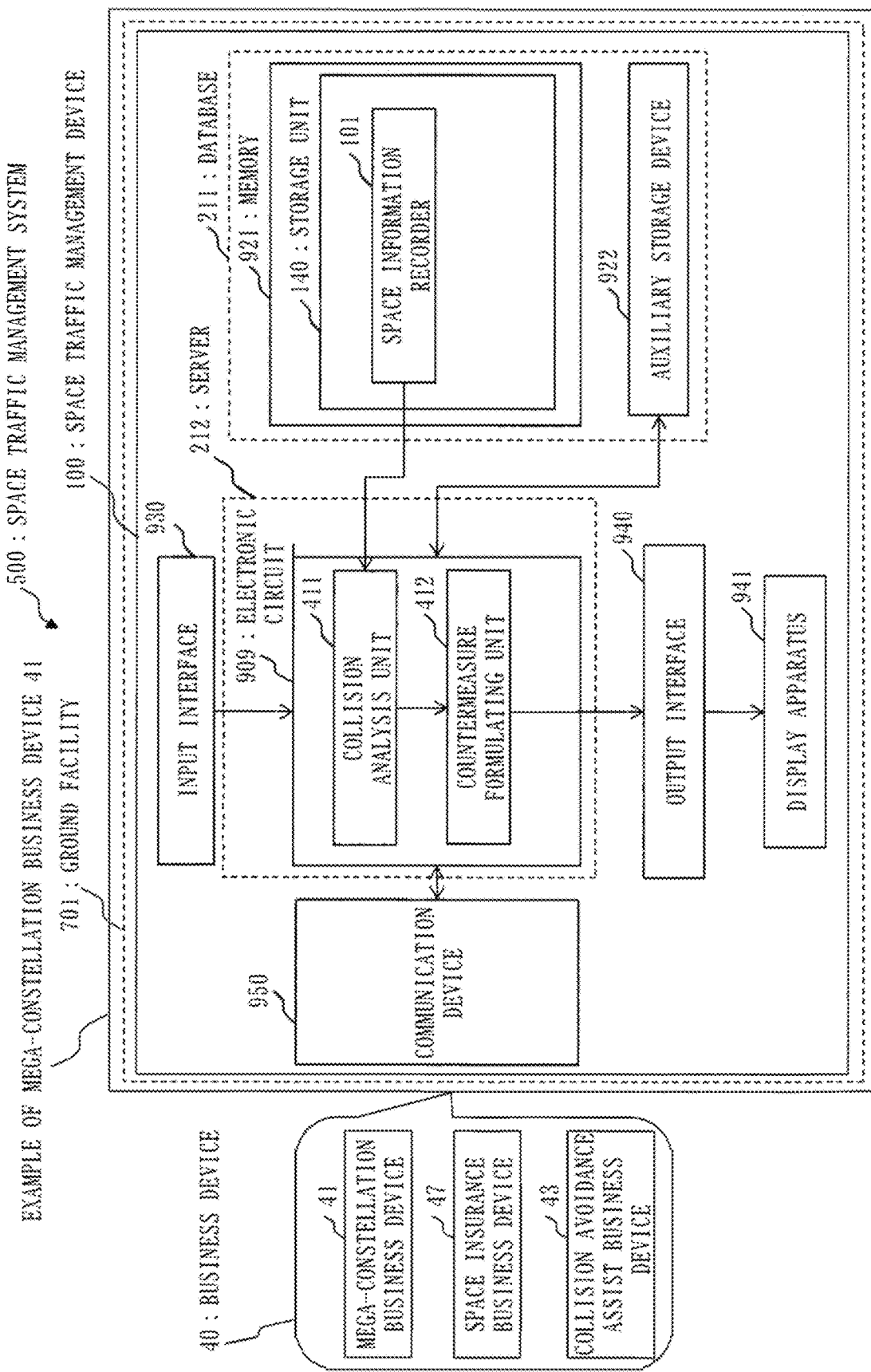
FIG. 23 presents a hardware configuration example of a space traffic management device according to a modification of Embodiment 1.

With referring to FIG. 23, a hardware configuration of a space traffic management device 100 according to a modification of the present embodiment will be described. Using a space traffic management device 100 of a mega-constellation business device 41 as an example, the hardware configuration of the space traffic management device 100 will be described. Note that space traffic management devices 100 of other business devices 40 have the same hardware configuration.

As described above, the space traffic management device 100 of the mega-constellation business device 41 is provided with the collision analysis unit 411, the countermeasure formulating unit 412, and the storage unit 140, as examples of function elements that implement the mega-constellation management function.

The space traffic management device 100 is provided with an electronic circuit 909 in place of a processor 910.

The electronic circuit 909 is a dedicated electronic circuit that implements the functions of the space traffic management device 100.

The electronic circuit 909 is specifically a single circuit, a composite circuit, a programmed processor, a parallel-programmed processor, a logic IC, a GA, an ASIC, or an FPGA. GA stands for Gate Array.

The functions of the space traffic management device 100 may be implemented by one electronic circuit, or may be distributed among a plurality of electronic circuits and implemented by them.

Another modification may be possible in which some of the functions of the space traffic management device 100 are implemented by an electronic circuit and the remaining functions are implemented by software.

A processor and an electronic circuit are called processing circuitry as well. That is, the functions of the space traffic management device 100 are implemented by processing circuitry.

Description of Effect of Present Embodiment

A mega-constellation satellite group constantly operates propulsion devices to intentionally conduct orbit control. Accordingly, to conduct high-accurate collision analysis, real-time high-accuracy orbital information must be used. However, it is reasonable to assume that only a mega-constellation business device that manages the relevant mega-constellation satellite group can grasp this information.

There is a case where a satellite at an unsteady operation stage which is possessed by a different mega-constellation business operator intrudes into a region where the mega-constellation satellite group flies. In this case, it is difficult for a mega-constellation business device to hold real-time high-accuracy orbital information possessed by a different business device, together with real-time high-accuracy orbital information of a satellite group of its own system, and to perform collision analysis.

In the present embodiment, business devices of a plurality of mega-constellation business operators and a business device of a collision avoidance assist business operator are provided with space traffic management devices. The space traffic management devices are connected to each other via a communication line in order to set up an environment that allows information sharing.

Furthermore, a database provided to the collision avoidance assist business operator records, in the database, a region where a plurality of mega-constellation satellite groups fly. In the space traffic management devices, this database is also called a space information recorder.

The collision avoidance assist business device acquires orbital information of an unsteady-operation individual satellite, such as a new satellite at an orbit insertion stage and a satellite at a deorbit stage after mission completion, from the mega-constellation business operator, and records the orbital information to the space information recorder. The collision avoidance assist business device also records launch orbital information of a rocket to be launched newly, to the space information recorder.

A danger analysis device is mounted in the space traffic management device provided to the collision avoidance assist business device. The danger analysis device identifies a mega-constellation satellite group flying at an orbital altitude which an unsteady-operation satellite or a new launch rocket passes on its flight route. The collision avoidance assist business device transmits a danger alarm and orbital information of the unsteady-operation space object in the identified mega-constellation business satellite group, to a space traffic management device of a business operator different from a business operator of the unsteady-operation space object.

The mega-constellation business device having acquired the danger alarm analyzes collision with the relevant unsteady space object with using real-time high-accuracy information of a mega-constellation satellite group which the mega-constellation business device manages.

When collision is predicted, the mega-constellation business device controls the mega-constellation satellite group it possesses, and formulates a plan for collision avoidance.

As described above, when the unsteady-operation space object is not provided with a control device or a provided control device has failed, the steady-operation mega-constellation satellite group takes a collision avoidance action.

In the case of a new rocket launch, a countermeasure of avoiding collision with the mega-constellation satellite group by controlling a launch timing may be possible. However, it is difficult to avoid collision in all flight regions of a plurality of mega-constellation satellite groups by timing control alone.

With the space traffic management system according to the present embodiment, when an unsteady-operation space object intrudes into a flight region of a steady-operation satellite group which is managed by a different business operator, real-time high-accuracy orbital information of both sides can be shared with the collision avoidance assist business device. This information sharing has an effect of enabling high-accuracy collision analysis. For example, assume that if an unsteady-operation space object is managed by a mega-constellation business operator A, a steady-operation mega-constellation satellite group is managed by a mega-constellation business operator B which is different from the mega-constellation business operator A.

With the space traffic management system according to the present embodiment, when collision is predicted, an appropriate collision avoidance countermeasure can be formulated, achieving an effect of collision avoidance.

Embodiment 2

In the present embodiment, a difference from Embodiment 1 and an additional point to Embodiment 1 will mainly be described.

In the present embodiment, a configuration having the same function as in Embodiment 1 will be denoted by the same reference sign, and its description will be omitted.

Due to emergence of mega-constellation business operators, currently, several thousand satellites fly at an orbital altitude of 500 km or less as if to exhaustively cover the sky. This poses a high risk of collision of a satellite in a process of deorbiting from a high altitude with a low-altitude satellite, collision of a low-altitude satellite with a new launch rocket, or collision of satellites with each other both during geostationary-orbital transfer. Above all, in order that different mega-constellation satellite groups coexist, a framework is required for each business operator to avoid collision with an unsteady space object intruding into a steady-operation satellite group. Hence, a framework is required in which a collision avoidance assist business operator issues a danger alarm and mega-constellation business operators perform collision analysis and collision avoidance.

Studies have been in progress on building a public information system called open architecture data repository (OADR) which allows business operators to share orbital information of a space object so that flight safety of the space object is ensured.

The present embodiment will describe a mode of ensuring flight safety of a space object by the public information system called OADR.

When setting up an OADR as a public institution of international cooperation, there is a possibility that the OADR is authorized to make an instruction or request to a business operator beyond borders.

For example, in central management of orbital information of space objects possessed by business operators around the world, it is rational if the OADR can make an instruction or a request to provide orbital information under a rule based on an international consensus.

When a particular country sets up an OADR as a public institution, there is a possibility that the OADR is authorized to make an instruction or request to business operators of the relevant country.

There is also a possibility that the OADR forms a framework of disclosing information to business operators of the relevant country unconditionally while disclosing information conditionally to the other business operators.

As a public condition, it is possible to set, for example, fee charging, price setting, disclosure item restriction, accuracy restriction of public information, disclosure frequency restriction, and non-disclosure to a specific business operator.

For example, a difference of no charging or fee charging, or a difference in an amount of fee for information acquisition may arise between the relevant country and other countries. How the public condition is set by the OADR affects framework making for space traffic management or industrial competitive power.

It is rational that, regarding space-object confidential information which serves security, the OADR being set up by a country as a public institution possesses the confidential information but keeps the confidential information closed to the outside. Therefore, there is a possibility that the OADR is provided with a database for storing non-public information, in addition to a database for information disclosure.

In addition, among pieces of space object information possessed by private business operators, there is information that cannot be disclosed to the public because, for example, the information belongs to a corporate secret. In addition, there is information that is not appropriate for public disclosure, because the information is under constant maneuver control and accordingly an amount of information or an update frequency of the information becomes enormous.

When conducting danger analysis and analysis evaluation related to approach or collision of a space object, it is necessary that orbital information of all space objects be dealt with regardless of whether the space object is confidential or not. For this reason, when the OADR as a public institution conducts danger analysis including confidential information and danger is predicted as a result of analysis evaluation, it is rational to restrict a publication target or a publication content and to conduct conditional disclosure. For example, it is rational to restrict the publication target or a publication content and to conduct conditional disclosure by processing information into disclosable information, and disclosing only orbital information of a risky timeframe to a disclosure target that contributes to danger avoidance.

In the future, when the number of on-orbit objects increases and the risk of approach or collision increases, various danger avoidance countermeasures will be needed, such as means with which a debris removal business operator removes dangerous debris, and means with which a mega-constellation business operator changes an orbital position or a passing timing so as to avoid collision. If the OADR, being a public institution, can instruct or request a business operator to execute a danger avoidance action, a tremendous effect can be expected in ensuring flight safety of space.

There are space objects managed by an institution, such as an emerging country venture business operator or a university, that is inexperienced in the space business and lacks information that serves danger avoidance. When it is predicted that a space object managed by such an institution which is inexperienced in the space business and lacks information that serves danger avoidance will intrude into an orbital altitude zone where a mega-constellation flies, the OADR intermediates to transmit the relevant information to the business operator in need of the information, so that the danger can be avoided quickly and effectively.

In addition, mediation or introduction of implementation of a danger avoidance countermeasure or space insurance to private business operators will contribute to promotion and industrialization of space traffic management.

The OADR may be realized in the following modes.

A mode where the OADR is provided with only a public database.

A mode where the OADR possesses a danger analysis means, a collision avoidance assist means, or a space situational awareness (SSA) means to positively contribute to danger avoidance independently.

A mode where the OADR gives an instruction or a request to a business operator, or performs mediation or introduction to a business operator, thus contributing to danger avoidance through information management.

For realizing the OADR, there are various possibilities other than the above-mentioned modes.

"The OADR mediates implementation of a space traffic management method" signifies a case where, for example, an entity implementing the space traffic management method includes a plurality of external business devices other than the OADR, and the OADR does not issue a compulsory order but encourages implementation of the method by intermediating among the plurality of business devices. "The OADR mediates implementation of the space traffic management method" is paraphrased as, for example, "the OADR intermediates so that a plurality of external business devices other than the OADR cooperate with each other to implement a space traffic management method". Alternatively, "mediation" may be replaced with "teaching".

A configuration example of the OADR according the present embodiment will be described below.

Configuration Example 1 of OADR

Figure 24:
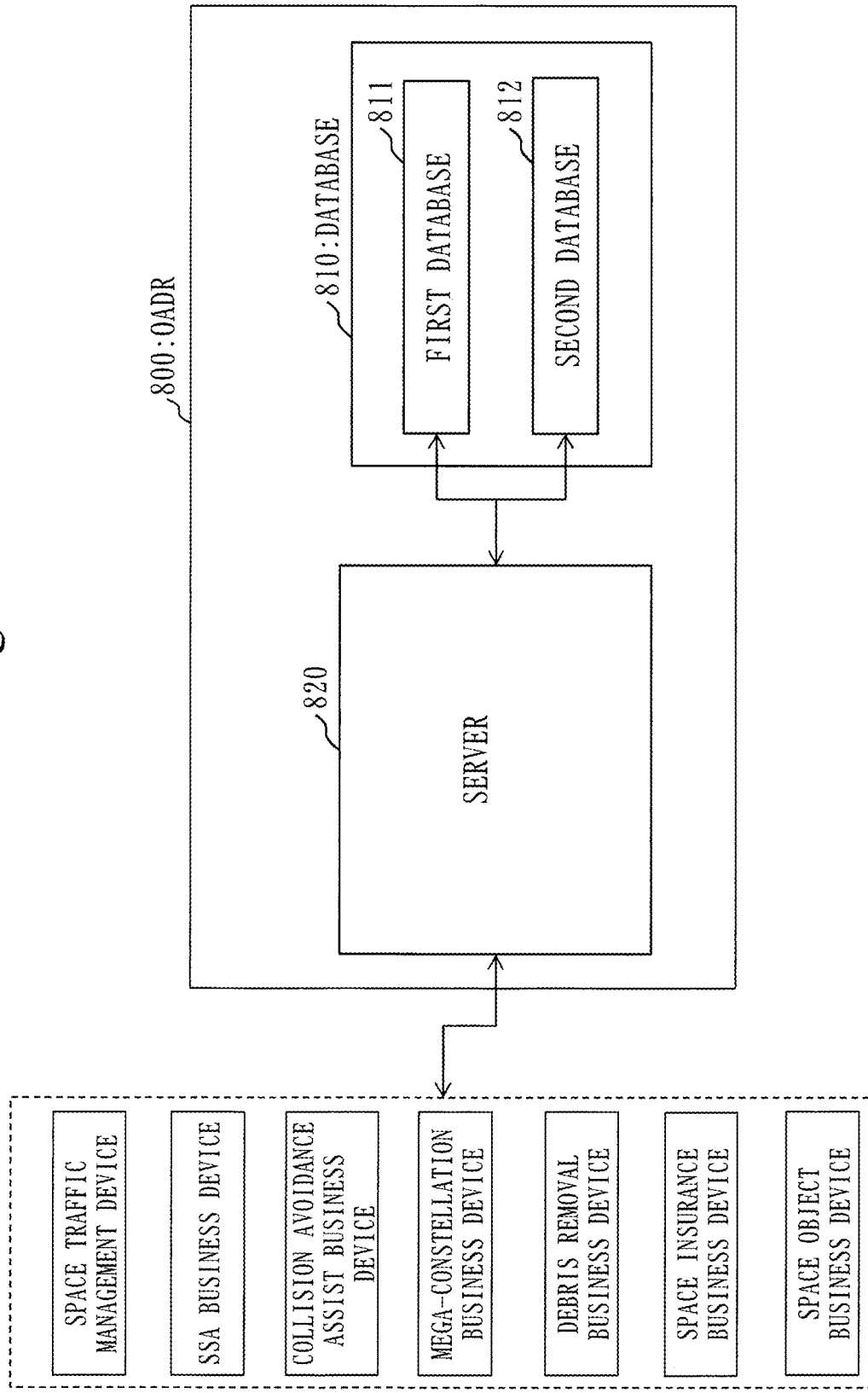
FIG. 24 presents a function configuration example of an OADR according to Embodiment 2.

FIG. 24 illustrates an OADR 800 as Configuration Example 1 according to the present embodiment.

The OADR 800 is a public information system to disclose orbital information of a space object. The OADR 800 is provided with a database 810 to store the orbital information of the space object, and a server 820.

The database 810 is provided with a first database 811 to store public information and a second database 812 to store non-public information.

The server 820 acquires space object information including non-public information from all or some of business devices which are: a space traffic management device; a space situational awareness business device (SSA business device); a collision avoidance assist business device; a mega-constellation business device; and a debris removal business device, and stores the acquired space object information to the second database 812. The space traffic management device is provided to, for example, CSpOC.

Conventionally, the U.S. CSpOC is not provided with a bi-directional line, and announces a danger alarm unidirectionally. If is provided with a space traffic management device, CSpOC can contribute to space traffic management by communication of the space traffic management device with the other business devices via a bi-directional communication line.

The server 820 generates conditional public information with restricted publication target and restricted publication content and stores the generated information to the first database 811.

Then, the server 820 transmits the conditional public information only to a particular business device among the SSA business device, the collision avoidance assist business device, the mega-constellation business device, the debris removal business device, and a space insurance business device which deals with a space insurance.

The OADR 800 of Configuration Example 1 mediates implementation of the space traffic management method described in Embodiment 1 while implementing the above functions.

There is a possibility that space object confidential information possessed by CSpOC and serving safety security is disclosed only to the OADR. Meanwhile, a risk of approach or collision must be analyzed to include the confidential information, and must be predicted.

After the information is processed into conditional disclosable information, the conditional public information which serves collision avoidance assist is shared only to a business device related to a collision risk. Hence, even a private business operator can take a collision avoidance action.

Among pieces of space object information possessed by the private business operators, regarding space object information that cannot be disclosed to the public, the OADR processes it into conditional disclosable information likewise, so that collision avoidance becomes possible.

Configuration Example 2 of OADR

Figure 25:
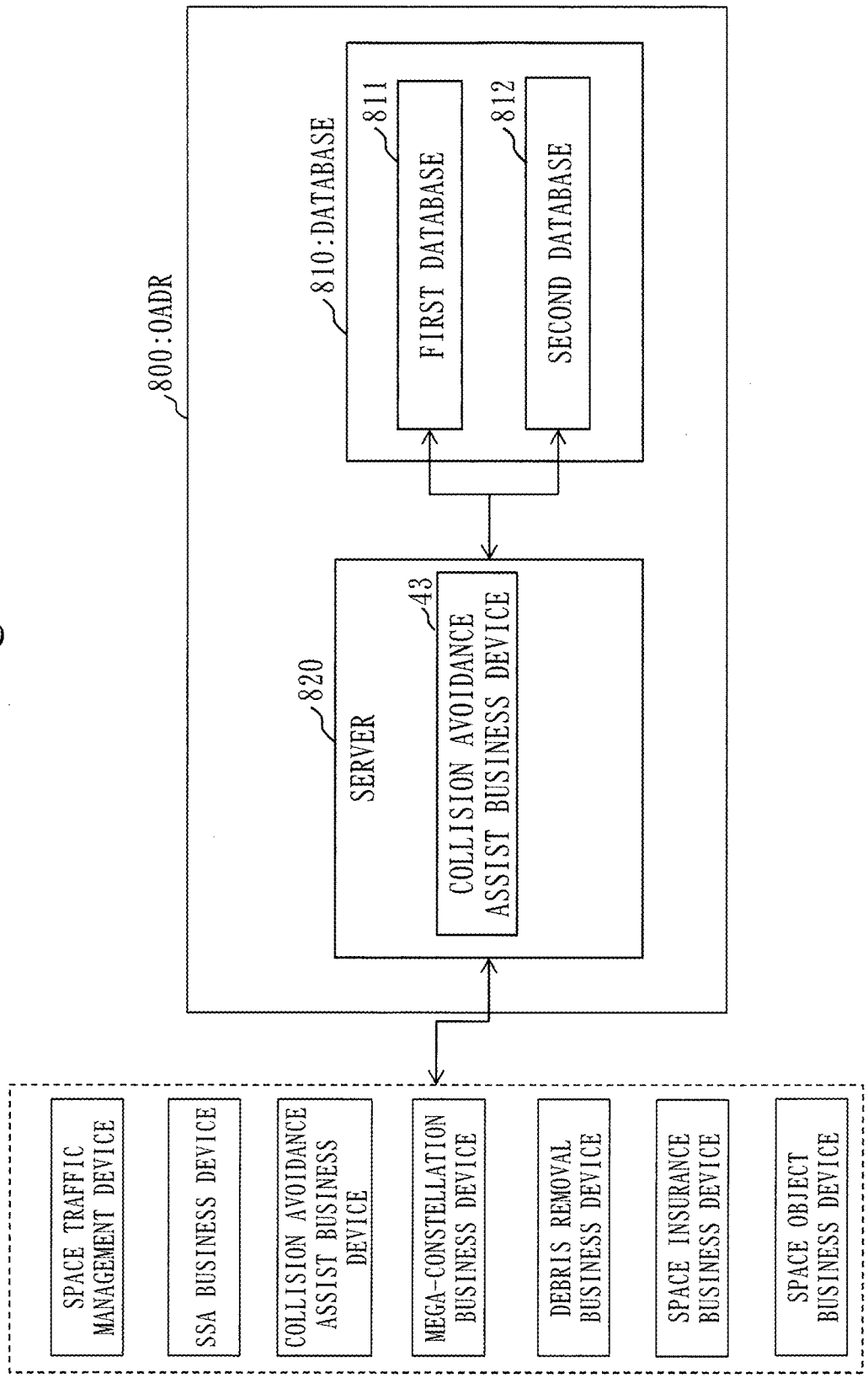
FIG. 25 presents a function configuration example of the OADR according to Embodiment 2.

FIG. 25 illustrates an OADR 800 as Configuration Example 2 according to the present embodiment.

The OADR 800 as Configuration Example 2 is provided with the collision avoidance assist business device described in Embodiment 1, in addition to Configuration Example 1. As illustrated in FIG. 25, a server 820 may be provided with a function of the collision avoidance assist business device.

The server 820 acquires space object information including non-public information from all or some of business devices which are: a space traffic management device; an SSA business device; another collision avoidance assist business device other than that of its own OADR; a mega-constellation business device; and a debris removal business device, and stores the acquired space object information to a second database 812. The space traffic management device is provided to, for example, CSpOC.

Another collision avoidance assist business device is another collision avoidance assist business device other than the collision avoidance assist business device of the OADR 800.

The server 820 generates conditional public information with restricted publication target and restricted publication content and stores the generated information to a first database 811.

Then, the server 820 transmits the conditional public information only to a particular business device among the SSA business device, another collision avoidance assist business device, the mega-constellation business device, the debris removal business device, and a space insurance business device which deals with a space insurance.

When the OADR serves as a collision avoidance assist business operator as in Configuration Example 2, the same effect as that of Configuration Example 1 can be obtained.

Configuration Example 3 of OADR

Figure 26:
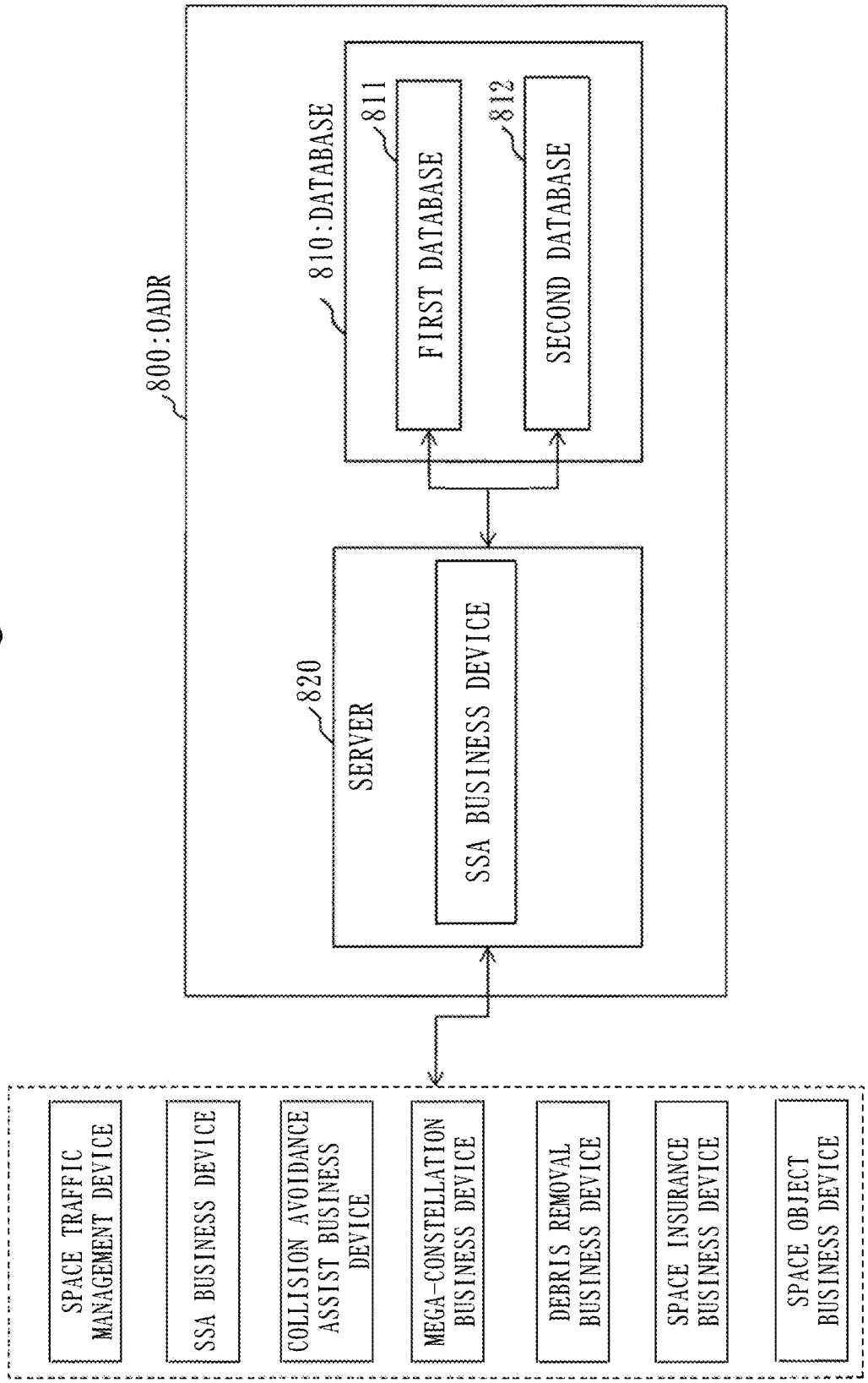
FIG. 26 presents a function configuration example of the OADR according to Embodiment 2.

FIG. 26 illustrates an OADR 800 as Configuration Example 3 according to the present embodiment.

The OADR 800 as Configuration Example 3 is provided with the SSA business device described in Embodiment 1, in addition to Configuration Example 1. The SSA business device is also called a space situational awareness business device that monitors space situation. As illustrated in FIG. 26, a server 820 may be provided with a function of the SSA business device.

The server 820 acquires space object information including non-public information from all or some of business devices which are: a space traffic management device; another SSA business device other than that of its own OADR; a collision avoidance assist business device; a mega-constellation business device; and a debris removal business device, and stores the acquired space object information to a second database 812. The space traffic management device is provided to, for example, CSpOC.

Another SSA business device is another SSA business device other than the SSA business device of the OADR 800.

The server 820 generates conditional public information with restricted publication target and restricted publication content and stores the generated information to a first database 811.

Then, the server 820 transmits the conditional public information only to a particular business device among another SSA business device, the collision avoidance assist business device, the mega-constellation business device, the debris removal business device, and a space insurance business device which deals with a space insurance.

When the OADR serves as an SSA business operator as in Configuration Example 3, the same effect as in Configuration Example 1 and Configuration Example 2 can be obtained.

In above Embodiments 1 and 2, individual units in each of the space traffic management system, the space traffic management device, and the business device are described as independent function blocks. However, the space traffic management system, space traffic management device, and business device need not have configurations as in the embodiments described above. The function blocks in each of the space traffic management system and the space traffic management device may have any configurations as far as they can implement the functions described in the above embodiments. Also, each of the space traffic management system, the space traffic management device, and the business device may be one device, or may be a system constituted of a plurality of devices.

A plurality of parts out of Embodiments 1 and 2 may be practiced by combination. Alternatively, one part of these embodiments may be practiced. Also, these embodiments may be practiced as a whole or partly by any combination.

That is, in Embodiments 1 and 2, any parts out of Embodiments 1 and 2 can be combined arbitrarily, or an arbitrary constituent element can be modified. Also, in Embodiments 1 and 2, an arbitrary constituent element can be omitted.

The embodiments described above are essentially preferable exemplifications and are not intended to limit the scope of the present disclosure, the scope of an application product of the present disclosure, and the scope of use of the present disclosure. Various changes can be made to the embodiments described above as necessary.

REFERENCE SIGNS LIST

20: satellite constellation; 21: orbital plane; 211: database; 212: server; 30: satellite; 31: satellite control device; 32: satellite communication device; 33: propulsion device; 34: attitude control device; 35: power supply device; 40: business device; 41: mega-constellation business device; 411: collision analysis unit; 412: countermeasure formulating unit; 431: orbital analysis unit; 432: announcement unit; 42: space object business device; 43: collision avoidance assist business device; 44: orbital transfer business device; 45: debris removal business device; 46: rocket launch business device; 47: space insurance business device; 51: orbit prediction information; 52: satellite orbit prediction information; 53: debris orbit prediction information; 511: space object ID; 512: predicted epoch; 513: predicted orbital element; 514: predicted error; 60: space object; 70: Earth; 100: space traffic management device; 140: storage unit; 55: orbit control command; 61: public orbital information; 63: unsteady orbital information; 64: real-time high-accuracy orbital information; 500: space traffic management system; 600: satellite constellation forming system; 11, 11b: satellite constellation forming unit; 300: satellite group; 700, 701: ground facility; 510: orbit control command generation unit; 520: analytical prediction unit; 909: electronic circuit; 910: processor; 921: memory; 922: auxiliary storage device; 930: input interface; 940: output interface; 941: display apparatus; 950: communication device; 101: space information recorder; 102: danger alarm device; 103: danger analysis device; 104: danger avoidance action assist device; 105: danger avoidance action implementation plan information; 200: communication line; 800: OADR; 810: database; 811: first database; 812: second database; 820: server.

The invention claimed is:

1. A space traffic management system in which space traffic management devices, individually mounted in a collision avoidance assist business device and a plurality of mega-constellation business devices, are connected to each other via a communication line, each of the space traffic management devices including a database and a sever, the collision avoidance assist business device assisting avoidance of collision of space objects with each other in outer space, the plurality of mega-constellation business devices managing mega-constellations which are satellite constellations each consisting of 100 or more satellites, wherein the databases of the space traffic management devices of the collision avoidance assist business devices each record orbital information, acquired from the plurality of mega-constellation business devices, of mega-constellation satellite groups during steady operation, and orbital information of an unsteady-operation space object, wherein the servers of the space traffic management devices of the collision avoidance assist business devices each comprise:

processing circuitry to identify a mega-constellation satellite group formed in an orbital altitude which the mega-constellation satellite group is anticipated to pass during a flight of the unsteady-operation space object, to announce a danger alarm and orbital information of the unsteady-operation space object to the mega-constellation business devices which manage the mega-constellation satellite groups, to analyze collision of the unsteady-operation space object with an individual satellite constituting a mega-constellation satellite group, and to formulate a collision avoidance countermeasure when collision is predicted.

2. The space traffic management system according to claim 1, wherein the space traffic management devices of the collision avoidance assist business device and the space traffic management devices of the mega-constellation business devices are connected to a space traffic management device provided to a space insurance business device of a space insurance business operator which runs a space insurance business.

3. The space traffic management system according to claim 1, wherein the unsteady-operation space object is an unsteady-operation individual satellite, or a new launch rocket that is to be launched newly.

4. A space traffic management device mounted in a collision avoidance assist business device of a space traffic management system in which space traffic management devices, individually mounted in the collision avoidance assist business device and a plurality of mega-constellation business devices, each include a database and a server, the space traffic management devices are connected to each other via a communication line, the collision avoidance assist business device assisting avoidance of collision of space objects with each other in outer space, the plurality of mega-constellation business devices managing mega-constellations which are satellite constellations each consisting of 100 or more satellites, the space traffic management device comprising:

a database to record orbital information, acquired from the plurality of mega-constellation business devices, of mega-constellation satellite groups during steady operation, and orbital information of an unsteady-operation space object, and a server including processing circuitry to identify a mega-constellation satellite group formed in an orbital altitude which the mega-constellation satellite group is anticipated to pass during a flight of the unsteady-operation space object, and to announce a danger alarm and orbital information of the unsteady-operation space object to the mega-constellation business devices which manage the mega-constellation satellite groups.

5. A collision avoidance assist business device of a space traffic management system in which space traffic management devices, individually mounted in the collision avoidance assist business device and a plurality of mega-constellation business devices, are connected to each other via a communication line, the collision avoidance assist business device assisting avoidance of collision of space objects with each other in outer space, the plurality of mega-constellation business devices managing mega-constellations which are satellite constellations each consisting of 100 or more satellites, the collision avoidance assist business device comprising:
a database to record
orbital information, acquired from the plurality of mega-constellation business devices, of mega-constellation satellite groups during steady operation, and orbital information of an unsteady-operation space object, and
a server including processing circuitry provided to the space traffic management device of the collision avoidance assist business device:
to identify a mega-constellation satellite group formed in an orbital altitude which the mega-constellation satellite group is anticipated to pass during a flight of the unsteady-operation space object, and
to announce a danger alarm and orbital information of the unsteady-operation space object to the mega-constellation business devices which manage the mega-constellation satellite groups.

6. A collision avoidance assist business device of a space traffic management system in which space traffic management devices, individually mounted in the collision avoidance assist business device and a plurality of mega-constellation business devices, are connected to each other via a communication line, the collision avoidance assist business device assisting avoidance of collision of space objects with each other in outer space, the plurality of mega-constellation business devices managing mega-constellations which are satellite constellations each consisting of 100 or more satellites, the collision avoidance assist business device including a database and a server,
wherein the collision avoidance assist business device performs danger analysis using orbital information, acquired from a first mega-constellation business device, of a mega-constellation satellite group in steady operation, orbital information, acquired from a second mega-constellation business device of an unsteady-operation individual satellite, or orbital information of a new launch rocket, and announces a danger alarm and orbital information of a space object to the mega-constellation business devices.

7. An SSA (Space Situational Awareness) business device of a space traffic management system in which space traffic management devices, individually mounted in a collision avoidance assist business device, a plurality of mega-constellation business devices, and the SSA business device, are connected to each other via a communication line, the collision avoidance assist business device assisting avoidance of collision of space objects with each other in outer space, the plurality of mega-constellation business devices managing mega-constellations which are satellite constellations each consisting of 100 or more satellites, the SSA business device being managed by an SSA business operator, each of the space traffic management devices including a database and a server,
wherein the SSA business device serves as the collision avoidance assist business device as well, and
wherein the SSA business device performs danger analysis using orbital information, acquired from the plurality of mega-constellation business devices, of a mega-constellation satellite group in steady operation, orbital information of an unsteady-operation individual satellite, or orbital information of a new launch rocket, and announces a danger alarm and orbital information of a space object to the mega-constellation business devices.

8. A mega-constellation business device of a space traffic management system in which space traffic management devices, individually mounted in a collision avoidance assist business device, a plurality of mega-constellation business devices, and an SSA (Space Situational Awareness) business device, each of the mega-constellation business devices, the collision avoidance assist business device, and the space traffic management devices including a database and a server, the space traffic management devices being connected to each other via a communication line, the collision avoidance assist business device assisting avoidance of collision of space objects with each other in outer space, the plurality of mega-constellation business devices managing mega-constellations which are satellite constellations each consisting of 100 or more satellites, the SSA business device being managed by an SSA business operator,
wherein the mega-constellation business device discloses orbital information of orbital information of a mega-constellation satellite group in steady operation to the collision avoidance assist business device or the SSA business device, and acquires a danger alarm and orbital information of a space object from the collision avoidance assist business device or the SSA business device.

9. The mega-constellation business device according to claim 8, wherein the processing circuitry performs collision analysis on a basis of the acquired danger alarm, and after collision is predicted, executes a collision avoidance action.

10. A mega-constellation business device of a space traffic management system in which space traffic management devices, individually mounted in a collision avoidance assist business device, a plurality of mega-constellation business devices, and an SSA (Space Situational Awareness) business device, each of the mega-constellation business devices, the collision avoidance assist business device, and the space traffic management devices including a database and a server, the space traffic management devices being connected to each other via a communication line, the collision avoidance assist business device assisting avoidance of collision of space objects with each other in outer space, the plurality of mega-constellation business devices managing mega-constellations which are satellite constellations each consisting of 100 or more satellites, the SSA business device being managed by an SSA business operator,
wherein the mega-constellation business device discloses orbital information of an unsteady-operation individual satellite to the collision avoidance assist business device or the SSA business device, and acquires a danger alarm from the collision avoidance assist business device, another mega-constellation business device, or the SSA business device.

11. The mega-constellation business device according to claim 10, wherein the mega-constellation business device performs collision analysis on a basis of the acquired danger alarm, and after collision is predicted, executes a collision avoidance action.

12. A mega-constellation business device of a space traffic management system in which space traffic management devices, individually mounted in a collision avoidance assist business device, a plurality of mega-constellation business devices, and an SSA (Space Situational Awareness) business device, each of the mega-constellation business devices, the collision avoidance assist device, and the space traffic management devices including a database and a server, the space traffic management devices being connected to each other via a communication line, the collision avoidance assist business device assisting avoidance of collision of space objects with each other in outer space, the plurality of mega-constellation business devices managing mega-constellations which are satellite constellations each consisting of 100 or more satellites, the SSA business device being managed by an SSA business operator, wherein the mega-constellation business device discloses orbital information of a new launch rocket to the collision avoidance assist business device or the SSA business device, and acquires a danger alarm from the collision avoidance assist business device, another mega-constellation business device, or the SSA business device.

13. The mega-constellation business device according to claim 12, wherein the mega-constellation business device performs collision analysis on a basis of the acquired danger alarm, and after collision is predicted, executes a collision avoidance action.

14. A mega-constellation business device of a space traffic management system in which space traffic management devices, individually mounted in a collision avoidance assist business device, a plurality of mega-constellation business devices, and an SSA (Space Situational Awareness) business device, each of the mega-constellation business devices, the collision avoidance assist business device, and the space traffic management devices including a database and a server, the space traffic management devices being connected to each other via a communication line, the collision avoidance assist business device assisting avoidance of collision of space objects with each other in outer space, the plurality of mega-constellation business devices managing mega-constellations which are satellite constellations each consisting of 100 or more satellites, the SSA business device being managed by an SSA business operator, wherein the mega-constellation business device discloses orbital information of an unsteady-operation individual satellite among constituent satellites of a first mega-constellation satellite group of a first mega-constellation business device, or orbital information of a new launch rocket, to a second mega-constellation business device, and acquires a danger alarm from the second mega-constellation business device, the collision avoidance assist business device, or the SSA business device.

15. The mega-constellation business device according to claim 14, wherein the mega-constellation business device performs collision analysis on a basis of the acquired danger alarm, and after collision is predicted, executes a collision avoidance action.

16. A space traffic management method of a space traffic management system in which space traffic management devices, individually mounted in a collision avoidance assist business device and a plurality of mega-constellation business devices, each of the mega-constellation business devices, the collision avoidance assist business device, and the space traffic management devices including a database and a server, the space traffic management devices being connected to each other via a communication line, the collision avoidance assist business device assisting avoidance of collision of space objects with each other in outer space, the plurality of mega-constellation business devices managing mega-constellations which are satellite constellations each consisting of 100 or more satellites, the space traffic management method comprising
recording orbital information, acquired from the plurality of mega-constellation business devices, of mega-constellation satellite groups during steady operation, and orbital information of an unsteady-operation space object, identifying a mega-constellation satellite group formed in an orbital altitude which the mega-constellation satellite group is anticipated to pass during a flight of the unsteady-operation space object, announcing a danger alarm and unsteady orbital information of the unsteady-operation space object to the mega-constellation business devices which manage the mega-constellation satellite groups, analyzing collision of the unsteady-operation space object with an individual satellite constituting a mega-constellation satellite group, and formulating a collision avoidance countermeasure when collision is predicted.

17. A mega-constellation business device which executes a collision avoidance action on a basis of the collision avoidance countermeasure formulated by the space traffic management method according to claim 16.

18. An OADR (Open Architecture Data Repository) which comprises a database to store orbital information of a space object, and a server, and discloses the orbital information of the space object, wherein the database includes a first database to store public information and a second database to store non-public information, and wherein the server acquires space object information including non-public information from all or some of business devices which are: a space traffic management device to manage space traffic; a space situational awareness business device being an SSA business device managed by an SSA (Space Situational Awareness) business operator; a collision avoidance assist business device to assist avoidance of collision of space objects with each other in space; a mega-constellation business device to manage a mega-constellation; and a debris removal business device to assist debris removal, and stores the acquired space object information to the second database, generates conditional public information with restricted publication target and restricted publication content and stores the generated information to the first database, transmits the conditional public information only to a particular business device among the space situational awareness business device, the collision avoidance assist business device, the mega-constellation business device, the debris removal business device, and a space insurance business device which deals with a space insurance, and mediates implementation of the space traffic management method according to claim 16.

19. An OADR (Open Architecture Data Repository) which comprises a database to store orbital information of a space object, and a server, comprises the collision avoidance assist business device according to claim 5, and discloses the orbital information of the space object, wherein the database includes a first database to store public information and a second database to store non-public information, and wherein the server acquires space object information including non-public information from all or some of business devices which are: a space traffic management device to manage space traffic; a space situational awareness business device to monitor space situation; another collision avoidance assist business device other than the collision avoidance business device of an own OADR; a mega-constellation business device to manage a mega-constellation; a debris removal business device to assist debris removal; and a space object business device to manage a particular space object, and stores the acquired space object information to the second database, generates conditional public information with restricted publication target and restricted publication content and stores the generated information to the first database, and transmits the conditional public information only to a particular business device among the space situational awareness business device, said another collision avoidance assist business device, the mega-constellation business device, the debris removal business device, and a space insurance business device which deals with a space insurance.

20. An OADR (Open Architecture Data Repository) which comprises a database to store orbital information of a space object, and a server, comprises a space situational awareness business device being the SSA business device according to claim 7, and discloses the orbital information of the space object, wherein the database includes a first database to store public information and a second database to store non-public information, and wherein the server acquires space object information including non-public information from all or some of business devices which are: a space traffic management device to manage space traffic; another space situational awareness business device other than the space situational awareness business device of an own OADR; a collision avoidance assist business device to assist collision avoidance of a space object in space; a mega-constellation business device to manage a mega-constellation; a debris removal business device to assist debris removal; and a space object business device to manage a particular space object, and stores the acquired space object information to the second database, generates conditional public information with restricted publication target and restricted publication content and stores the generated information to the first database, and transmits the conditional public information only to a particular business device among said another space situational awareness business device, the collision avoidance assist business device, the mega-constellation business device, the debris removal business device, and a space insurance business device which deals with a space insurance.

* * * * *